United States Patent
Ogata et al.

(10) Patent No.: US 12,236,723 B2
(45) Date of Patent: Feb. 25, 2025

(54) MANAGEMENT DEVICE, IN-VEHICLE SYSTEM, VEHICLE, COMMUNICATION MANAGEMENT METHOD AND STORAGE MEDIUM

(71) Applicants: Sumitomo Electric Industries, Ltd., Osaka (JP); Sumitomo Wiring Systems, Ltd., Yokkaichi (JP); Autonetworks Technologies, Ltd., Yokkaichi (JP)

(72) Inventors: Kenta Ogata, Osaka (JP); Tatsuya Izumi, Osaka (JP); Yusuke Yamamoto, Osaka (JP); Yojiro Suyama, Osaka (JP); Hideyuki Tanaka, Osaka (JP); Junji Yano, Osaka (JP); Darmawan Go, Yokkaichi (JP)

(73) Assignees: SUMITOMO ELECTRIC INDUSTRIES. LTD., Osaka (JP); SUMITOMO WIRING SYSTEMS, LTD., Yokkaichi (JP); AUTONETWORKS TECHNOLOGIES, LTD., Yokkaichi (JP)

(*) Notice: Subject to any disclaimer, the term of this patent is extended or adjusted under 35 U.S.C. 154(b) by 0 days.

(21) Appl. No.: 17/766,252

(22) PCT Filed: Sep. 9, 2020

(86) PCT No.: PCT/JP2020/034131
§ 371 (c)(1),
(2) Date: Apr. 4, 2022

(87) PCT Pub. No.: WO2021/079638
PCT Pub. Date: Apr. 29, 2021

(65) Prior Publication Data
US 2024/0054821 A1    Feb. 15, 2024

(30) Foreign Application Priority Data

Oct. 25, 2019    (JP) .................................. 2019-194635

(51) Int. Cl.
*G07C 5/00*    (2006.01)
*H04L 47/70*    (2022.01)

(52) U.S. Cl.
CPC .............. *G07C 5/008* (2013.01); *H04L 47/70* (2013.01)

(58) Field of Classification Search
None
See application file for complete search history.

(56) References Cited

U.S. PATENT DOCUMENTS

2009/0172164 A1*    7/2009    Tanaka ................ H04L 67/1076
                                                709/226
2009/0238196 A1*    9/2009    Ukita .................... H04L 45/125
                                                370/408

(Continued)

FOREIGN PATENT DOCUMENTS

JP        2010173366 A    *    8/2010
JP        2013-258700 A        12/2013

(Continued)

*Primary Examiner* — Muhammad Adnan
(74) *Attorney, Agent, or Firm* — XSENSUS LLP

(57) ABSTRACT

A management device to be used in an in-vehicle network including a plurality of function units installed in a vehicle includes: a state information acquisition unit configured to acquire state information indicating a state of the vehicle; and an allocation unit configured to change allocation of transmission bands of a plurality of logical paths between the function units in accordance with the state of the vehicle indicated by the state information acquired by the state information acquisition unit.

8 Claims, 17 Drawing Sheets

PT1

| OPERATION STATE OF ENGINE | ALLOCATION PATTERN OF TRANSMISSION BAND | TRANSMISSION BAND OF LOGICAL PATH P1 | TRANSMISSION BAND OF LOGICAL PATH P2 |
|---|---|---|---|
| DRIVE STATE | PATTERN A | 300Mbps (30%) | 700Mbps (70%) |
| STOP STATE | PATTERN B | 900Mbps (90%) | 100Mbps (10%) |

(56) References Cited

U.S. PATENT DOCUMENTS

| | | | |
|---|---|---|---|
| 2013/0208599 A1* | 8/2013 | Mashimo | H04L 45/42 370/238 |
| 2013/0339537 A1 | 12/2013 | Joy et al. | |
| 2016/0013979 A1* | 1/2016 | Coloney | H04L 41/0813 709/221 |
| 2017/0289036 A1* | 10/2017 | Vasudevan | H04L 49/70 |
| 2020/0145293 A1 | 5/2020 | Terazawa et al. | |
| 2020/0374007 A1 | 11/2020 | Tanaka et al. | |
| 2021/0021615 A1* | 1/2021 | Go | H04L 63/123 |
| 2021/0105324 A1* | 4/2021 | Iwata | H04L 67/12 |
| 2021/0344522 A1* | 11/2021 | Iwata | H04L 12/4641 |
| 2022/0183052 A1* | 6/2022 | Yamamoto | H04L 41/082 |
| 2022/0231997 A1* | 7/2022 | Yamamoto | H04L 63/08 |
| 2022/0239528 A1* | 7/2022 | Yamamoto | H04L 67/565 |

FOREIGN PATENT DOCUMENTS

| | | |
|---|---|---|
| JP | 2019-29992 A | 2/2019 |
| WO | 2012/063334 A1 | 5/2012 |
| WO | 2019/111447 A1 | 6/2019 |

* cited by examiner

FIG. 5

| OPERATION STATE OF ENGINE | ALLOCATION PATTERN OF TRANSMISSION BAND | TRANSMISSION BAND OF LOGICAL PATH P1 | TRANSMISSION BAND OF LOGICAL PATH P2 |
|---|---|---|---|
| DRIVE STATE | PATTERN A | 300Mbps (30%) | 700Mbps (70%) |
| STOP STATE | PATTERN B | 900Mbps (90%) | 100Mbps (10%) |

PT1

MANAGEMENT DEVICE, IN-VEHICLE SYSTEM, VEHICLE, COMMUNICATION MANAGEMENT METHOD AND STORAGE MEDIUM

CROSS-REFERENCE TO RELATED APPLICATIONS

The present application is based on PCT/JP2020/034131, filed on Sep. 9, 2020, which claims priority to Japanese Application No. 2019-194635, filed on Oct. 25, 2019, the entire contents of each are incorporated herein by reference.

TECHNICAL FIELD

The present disclosure relates to a management device, an in-vehicle system, a vehicle, a communication management method, and a communication management program.

This application claims priority on Japanese Patent Application No. 2019-194635 filed on Oct. 25, 2019, the entire content of which is incorporated herein by reference.

BACKGROUND ART

PATENT LITERATURE 1 (International Publication No. WO2012/063334) discloses a memory control device as follows. That is, the memory control device has connected thereto an electronic calculator and an I/O device, and has a dirty bit array for dividing a specific region of a memory of the electronic calculator into pages and for storing the presence or absence of memory writing for each divided page, and a memory writing monitoring mechanism for monitoring memory writing with respect to the memory of the electronic calculator from the I/O device. When memory writing from the I/O device with respect to the specific region of the memory has been observed by the monitoring mechanism, a page for which the memory writing has been performed is determined on the basis of the address of the memory writing, and the presence of the memory writing with respect to the page is recorded in the dirty bit array.

CITATION LIST

Patent Literature

PATENT LITERATURE 1: International Publication No. WO2012/063334

SUMMARY OF THE INVENTION

A management device of the present disclosure is to be used in an in-vehicle network including a plurality of function units installed in a vehicle. The management device includes: a state information acquisition unit configured to acquire state information indicating a state of the vehicle; and an allocation unit configured to change allocation of transmission bands of a plurality of logical paths between the function units in accordance with the state of the vehicle indicated by the state information acquired by the state information acquisition unit.

An in-vehicle system of the present disclosure includes: a plurality of function units installed in a vehicle; and a management device to be used in an in-vehicle network including the plurality of function units. The management device changes allocation of transmission bands of a plurality of logical paths between the function units in accordance with a state of the vehicle, and transmits band setting information indicating a transmission band after having been changed of each logical path, to one or a plurality of the function units. Each function unit changes the transmission band of each logical path in accordance with the band setting information received from the management device.

A communication management method of the present disclosure is to be performed in a management device to be used in an in-vehicle network including a plurality of function units installed in a vehicle. The communication management method includes the steps of: acquiring state information indicating a state of the vehicle; and changing allocation of transmission bands of a plurality of logical paths between the function units in accordance with the state of the vehicle indicated by the acquired state information.

A communication management program of the present disclosure is to be used in a management device to be used in an in-vehicle network including a plurality of function units installed in a vehicle. The communication management program is for causing a computer to function as: a state information acquisition unit configured to acquire state information indicating a state of the vehicle; and an allocation unit configured to change allocation of transmission bands of a plurality of logical paths between the function units in accordance with the state of the vehicle indicated by the state information acquired by the state information acquisition unit.

One mode of the present disclosure can be realized not only as a management device including such a characteristic processing unit, but also as a semiconductor integrated circuit that realizes a part or the entirety of the management device. One mode of the present disclosure can be realized not only as an in-vehicle system including such a characteristic processing unit, but also as a method that has the characteristic process steps, as a semiconductor integrated circuit that realizes a part or the entirety of the in-vehicle system, or as a program for causing a computer to execute process steps in the in-vehicle system.

BRIEF DESCRIPTION OF DRAWINGS

FIG. 5 shows an example of a pattern table stored in a storage unit in the vehicle control device according to the embodiment of the present disclosure.

DETAILED DESCRIPTION

Figure 1:
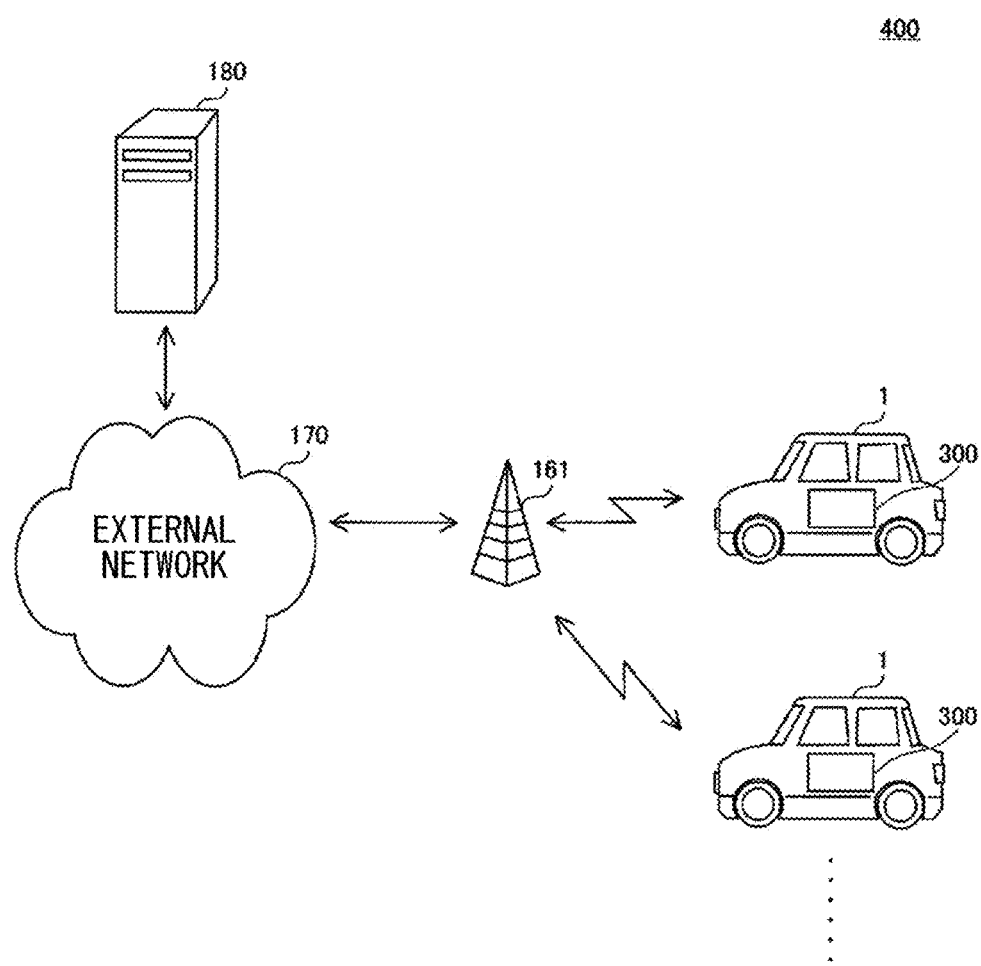
FIG. 1 shows a configuration of a communication system according to an embodiment of the present disclosure.

To date, a technology, a so-called live migration, in which a guest OS (Operating System) operating on a hypervisor of a specific server is caused to migrate onto a hypervisor of another server via a network without stopping the operation of the guest OS, has been known. For example, when the processing load of the entire system is small, if a plurality of guest OSs are aggregated on a hypervisor of one physical machine by using live migration, and operation of physical machines other than said physical machine is stopped, power consumption of the entire system can be reduced.

Problems to be Solved by the Present Disclosure

For example, in an in-vehicle network, being able to efficiently transmit data of a large volume is useful in terms of reduction, etc., of the load of each ECU (Electronic Control Unit) in the in-vehicle network.

The present disclosure has been made in order to solve the above problem. An object of the present disclosure is to provide a management device, an in-vehicle system, a vehicle, a communication management method, and a communication management program that can more efficiently perform data transmission in an in-vehicle network.

Effects of the Present Disclosure

According to the present disclosure, data transmission in an in-vehicle network can be more efficiently performed.

Description of Embodiment of the Present Disclosure

First, contents of an embodiment of the present disclosure are listed and described.

(1) A management device according to the embodiment of the present disclosure is to be used in an in-vehicle network including a plurality of function units installed in a vehicle. The management device includes: a state information acquisition unit configured to acquire state information indicating a state of the vehicle; and an allocation unit configured to change allocation of transmission bands of a plurality of logical paths between the function units in accordance with the state of the vehicle indicated by the state information acquired by the state information acquisition unit.

Due to the configuration in which allocation of transmission bands of a plurality of logical paths between function units is changed in accordance with the state of the vehicle, transmission bands can be more appropriately allocated, in the in-vehicle network, to logical paths between function units in accordance with the content of communication performed for each state of the vehicle, for example. Accordingly, for example, if the transmission band of a logical path having a small amount of data to be transmitted is set to be small while the transmission band of a logical path having a large amount of data to be transmitted is set to be large, data of a large volume can be more efficiently transmitted, for example. Therefore, in the vehicle control device according to the embodiment of the present disclosure, data transmission in the in-vehicle network can be more efficiently performed.

(2) Preferably, the management device further includes a storage unit configured to store an allocation pattern of the transmission band of each logical path for each state of the vehicle. The allocation unit determines an allocation content of the transmission band of each logical path between the function units in accordance with the allocation pattern corresponding to the state of the vehicle.

With this configuration, an allocation content of the transmission band of each logical path between function units can be determined through a simple process.

(3) Preferably, the management device further includes a configuration information acquisition unit configured to acquire configuration information regarding a configuration of the in-vehicle network. The allocation unit determines an allocation content of the transmission band of each logical path between the function units on the basis of the configuration information acquired by the configuration information acquisition unit and the state of the vehicle indicated by the state information acquired by the state information acquisition unit.

With this configuration, an allocation content of the transmission band of each logical path can be determined in consideration of the configuration of the present in-vehicle network. For example, when the configuration of the in-vehicle network has been changed due to addition of a new function unit to the in-vehicle network, an allocation content of the transmission band can be determined in consideration of the configuration of the in-vehicle network after the change.

(4) More preferably, in accordance with transition of the state of the vehicle, the configuration information acquisition unit acquires, as the configuration information, necessary band information indicating a band necessary for communication between the function units, for each state of the vehicle. The allocation unit determines an allocation content of the transmission band of each logical path between the function units on the basis of the necessary band information acquired by the configuration information acquisition unit and the state of the vehicle indicated by the state information acquired by the state information acquisition unit.

With this configuration, a more appropriate allocation content of a transmission band of each logical path can be determined by using information of the band necessary for communication between function units and according to the state of the vehicle.

(5) Preferably, a first logical path among the plurality of logical paths is realized by a plurality of transmission paths including a first transmission path and a second transmission path each being a physical transmission path, and a second logical path among the plurality of logical paths is realized by a plurality of transmission paths including the first transmission path and a third transmission path each being a physical transmission path.

With this configuration, more efficient data transmission can be realized in more diverse in-vehicle networks.

(6) Preferably, the allocation unit allocates a transmission band that is greater than zero, to all of the logical paths.

With this configuration, for example, in all of the logical paths, a minimum transmission band for communication that should be periodically performed can be ensured irrespective of the state of the vehicle.

(7) An in-vehicle system according to the embodiment of the present disclosure includes: a plurality of function units installed in a vehicle; and a management device to be used in an in-vehicle network including the plurality of function units. The management device changes allocation of transmission bands of a plurality of logical paths between the function units in accordance with a state of the vehicle, and transmits band setting information indicating a transmission band after having been changed of each logical path, to one or a plurality of the function units. Each function unit changes the transmission band of each logical path in accordance with the band setting information received from the management device.

Due to the configuration in which allocation of transmission bands of a plurality of logical paths between function units is changed in accordance with the state of the vehicle, transmission bands can be more appropriately allocated, in the in-vehicle network, to logical paths between function units in accordance with the content of communication performed for each state of the vehicle, for example. Accordingly, for example, if the transmission band of a logical path having a small amount of data to be transmitted is set to be small while the transmission band of a logical path having a large amount of data to be transmitted is set to be large, data of a large volume can be more efficiently transmitted, for example. Therefore, in the in-vehicle system according to the embodiment of the present disclosure, data transmission in the in-vehicle network can be more efficiently performed.

(8) A vehicle according to the embodiment of the present disclosure includes the in-vehicle system.

With this configuration, in the vehicle including the in-vehicle system, data transmission in the in-vehicle network can be more efficiently performed.

(9) A communication management method according to the embodiment of the present disclosure is to be performed in a management device to be used in an in-vehicle network including a plurality of function units installed in a vehicle. The communication management method includes the steps of: acquiring state information indicating a state of the vehicle; and changing allocation of transmission bands of a plurality of logical paths between the function units in accordance with the state of the vehicle indicated by the acquired state information.

Due to the method in which allocation of transmission bands of a plurality of logical paths between function units is changed in accordance with the state of the vehicle, transmission bands can be more appropriately allocated, in the in-vehicle network, to logical paths between function units in accordance with the content of communication performed for each state of the vehicle, for example. Accordingly, for example, if the transmission band of a logical path having a small amount of data to be transmitted is set to be small while the transmission band of a logical path having a large amount of data to be transmitted is set to be large, data of a large volume can be more efficiently transmitted, for example. Therefore, with the communication management method according to the embodiment of the present disclosure, data transmission in the in-vehicle network can be more efficiently performed.

(10) A communication management program according to the embodiment of the present disclosure is to be used in a management device to be used in an in-vehicle network including a plurality of function units installed in a vehicle. The communication management program is for causing a computer to function as: a state information acquisition unit configured to acquire state information indicating a state of the vehicle; and an allocation unit configured to change allocation of transmission bands of a plurality of logical paths between the function units in accordance with the state of the vehicle indicated by the state information acquired by the state information acquisition unit.

Due to the configuration in which allocation of transmission bands of a plurality of logical paths between function units is changed in accordance with the state of the vehicle, transmission bands can be more appropriately allocated, in the in-vehicle network, to logical paths between function units in accordance with the content of communication performed for each state of the vehicle, for example. Accordingly, for example, if the transmission band of a logical path having a small amount of data to be transmitted is set to be small while the transmission band of a logical path having a large amount of data to be transmitted is set to be large, data of a large volume can be more efficiently transmitted, for example. Therefore, with the communication management program according to the embodiment of the present disclosure, data transmission in the in-vehicle network can be more efficiently performed.

Hereinafter, an embodiment of the present disclosure will be described with reference to the drawings. In the drawings, the same or corresponding parts are denoted by the same reference signs, and descriptions thereof are not repeated. At least some parts of the embodiments described below can be combined together as desired.

[Vehicle Communication System]

FIG. 1 shows a configuration of a communication system according to an embodiment of the present disclosure.

With reference to FIG. 1, a communication system 400 includes a server 180 and one or a plurality of in-vehicle systems 300. Each in-vehicle system 300 is installed in a vehicle 1.

Figure 2:
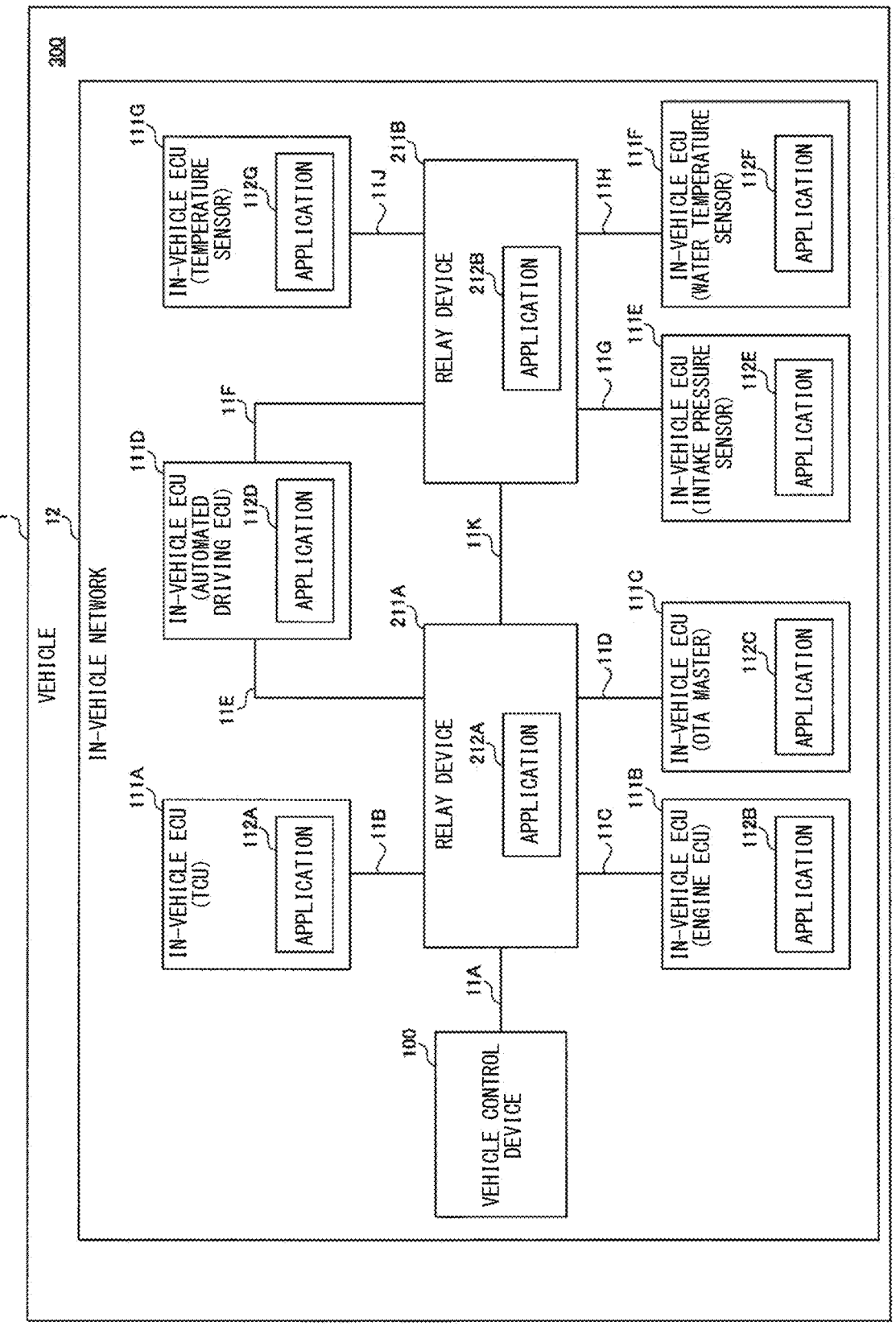
FIG. 2 shows an example of a configuration of an in-vehicle system according to the embodiment of the present disclosure.

FIG. 2 shows an example of a configuration of an in-vehicle system according to the embodiment of the present disclosure.

With reference to FIG. 2, the in-vehicle system 300 includes a plurality of in-vehicle ECUs 111, relay devices 211A, 211B, and a vehicle control device 100. The in-vehicle ECUs 111 and the relay devices 211A, 211B are examples of in-vehicle devices. The vehicle control device 100 is an example of a management device.

Specifically, the in-vehicle system 300 includes in-vehicle ECUs 111A to 111G as the in-vehicle ECUs 111. Hereinafter, each of the relay devices 211A, 211B will also be referred to as a relay device 211.

Each in-vehicle ECU 111 includes an application 112. More specifically, as the application 112, the in-vehicle ECU 111A includes an application 112A, the in-vehicle ECU 111B includes an application 112B, the in-vehicle ECU 111C includes an application 112C, the in-vehicle ECU 111D includes an application 112D, the in-vehicle ECU 111E includes an application 112E, the in-vehicle ECU 111F includes an application 112F, and the in-vehicle ECU 111G includes an application 112G.

Each relay device 211 includes an application 212. More specifically, as the application 212, the relay device 211A includes an application 212A, and the relay device 211B includes an application 212B.

The in-vehicle ECUs 111A to 111G and the relay devices 211A, 211B form an in-vehicle network 12. The vehicle control device 100 is used in the in-vehicle network 12.

The in-vehicle ECUs 111, the relay devices 211, the applications 112, and the applications 212 are examples of function units installed in the vehicle 1, among function units, i.e., objects, in the in-vehicle network 12.

The in-vehicle system 300 may not necessarily be provided with seven in-vehicle ECUs 111 and may be provided with six or less or eight or more in-vehicle ECUs 111. The in-vehicle system 300 may not necessarily be configured such that one application 112 is provided to one in-vehicle ECU 111, and may be configured such that two or more applications 112 are provided to one in-vehicle ECU 111.

The in-vehicle system 300 may not necessarily be provided with two relay devices 211, and may be provided with one or three or more relay devices 211. The in-vehicle system 300 may not necessarily be configured such that one application 212 is provided to one relay device 211, and may be configured such that two or more applications 212 are provided to one relay device 211.

The in-vehicle network 12 may include, as function units, i.e., objects, an external device outside the vehicle 1 and an application provided to the external device.

The in-vehicle ECUs 111 are, for example, a TCU (Telematics Communication Unit), an automated driving ECU, an engine ECU, a sensor, a navigation device, a human machine interface, a camera, an OTA (Over The Air) master, and the like.

In this example, the in-vehicle ECUs 111A, 111B, 111C, 111D, 111E, 111F, 111G are a TCU, an automated driving ECU, an OTA master, an engine ECU, an intake pressure sensor, a water temperature sensor, and a temperature sensor, respectively.

Hereinafter, the in-vehicle ECUs 111A, 111B, 111C, 111D, 111E, 111F, 111G will also be referred to as a TCU 111A, an engine ECU 111B, an OTA master 111C, an automated driving ECU 111D, an intake pressure sensor 111E, a water temperature sensor 111F, and a temperature sensor 111G, respectively.

In the in-vehicle network 12, the vehicle control device 100 and each in-vehicle ECU 111 is connected to a relay device 211 via an Ethernet (registered trademark) cable, for example.

More specifically, the vehicle control device 100 is connected to the relay device 211A via an Ethernet cable 11A. The TCU 111A is connected to the relay device 211A via an Ethernet cable 11B. The engine ECU 111B is connected to the relay device 211A via an Ethernet cable 11C. The OTA master 111C is connected to the relay device 211A via an Ethernet cable 11D. The automated driving ECU 111D is connected to the relay device 211A via an Ethernet cable 11E and is connected to the relay device 211B via an Ethernet cable 11F. The intake pressure sensor 111E is connected to the relay device 211B via an Ethernet cable 11G. The water temperature sensor 111F is connected to the relay device 211B via an Ethernet cable 11H. The temperature sensor 111G is connected to the relay device 211B via an Ethernet cable 11J.

The relay device 211A and the relay device 211B are connected to each other via an Ethernet cable 11K.

Each relay device 211 is a gateway device, for example, and can relay data between a plurality of in-vehicle ECUs 111 connected to the relay device 211. The relay device 211 can perform a relay process in accordance with, for example, a layer 2, and a layer 3 of a higher order than the layer 2, and performs a relay process of a frame between in-vehicle ECUs 111 belonging to the same VLAN, and a relay process of a frame between in-vehicle ECUs 111 belonging to different VLANs, for example.

The relay device 211 performs a relay process of an Ethernet frame in accordance with an Ethernet communication standard. Specifically, the relay device 211 relays an Ethernet frame sent and received between in-vehicle ECUs 111, for example. An IP packet is stored in an Ethernet frame.

In the in-vehicle system 300, performing relay of an Ethernet frame in accordance with an Ethernet communication standard is not necessary, and relay of data may be performed in accordance with a communication standard such as CAN (Controller Area Network) (registered trademark), FlexRay (registered trademark), MOST (Media Oriented Systems Transport) (registered trademark), or LIN (Local Interconnect Network), for example.

With reference to FIG. 1 and FIG. 2, the TCU 111A can communicate with the server 180. Specifically, the TCU 111A can communicate with the server 180 via a wireless base station device 161 by using an IP packet, for example.

More specifically, the TCU 111A can perform wireless communication with the wireless base station device 161 in accordance with a communication standard such as LTE (Long Term Evolution) or 3G, for example.

Specifically, when the wireless base station device 161 has received an IP packet via an external network 170 from the server 180, the wireless base station device 161 causes the received IP packet to be included in a radio signal, and transmits the radio signal to the TCU 111A.

For example, upon receiving from the wireless base station device 161 the radio signal including the IP packet from the server 180, the TCU 111A acquires the IP packet from the received radio signal, stores the acquired IP packet into an Ethernet frame, and transmits the Ethernet frame to the relay device 211A.

Meanwhile, when the TCU 111A has received an Ethernet frame from the relay device 211A, the TCU 111A acquires an IP packet from the received Ethernet frame, causes the acquired IP packet to be included in a radio signal, and transmits the radio signal to the wireless base station device 161.

Upon receiving the radio signal from the TCU 111A, the wireless base station device 161 acquires the IP packet from the received radio signal, and transmits the acquired IP packet to the server 180 via the external network 170.

The engine ECU 111B can communicate with another in-vehicle ECU 111 via the relay device 211. The engine ECU 111B controls the engine in the vehicle 1, for example. More specifically, the engine ECU 111B acquires pieces of information that indicate, for example, the number of revolutions of the engine, the vehicle speed of the vehicle 1, the shaft torque of the engine, the state of the transmission, the state of a throttle valve, a measurement value of each sensor, and the like, and controls the engine on the basis of the acquired information.

The engine ECU 111B periodically or non-periodically transmits engine information indicating the operation state of the engine, to the vehicle control device 100 via the relay device 211.

For example, when the engine ECU 111B has performed switching of the operation state of the engine, the engine ECU 111B transmits, to the vehicle control device 100 via the relay device 211, engine information indicating that switching of the operation state has been performed.

Specifically, when the engine ECU 111B has switched the engine from a drive state to a stop state, the engine ECU 111B transmits engine information indicating that the engine has been switched to the stop state, to the vehicle control device 100 via the relay device 211. When the engine ECU 111B has switched the engine from the stop state to the drive state, the engine ECU 111B transmits engine information indicating that the engine has been switched to the drive state, to the vehicle control device 100 via the relay device 211.

The OTA master 111C can communicate with another in-vehicle ECU 111 via the relay device 211. The OTA master 111C receives an update program for an in-vehicle ECU 111 from the server 180 via the TCU 111A and the relay device 211A, and transmits the received update program to the in-vehicle ECU 111 to be updated, for example.

When the OTA master 111C has received an update program for an in-vehicle ECU 111 from the server 180 via the TCU 111A and the relay device 211A, the OTA master 111C transmits, to the vehicle control device 100 via the relay device 211, request band information indicating a transmission band necessary for transmission of the update program to the in-vehicle ECU 111 to be updated.

The automated driving ECU 111D can communicate with another in-vehicle ECU 111 via the relay device 211. The automated driving ECU 111D performs detection of the traveling state of the vehicle 1 on the basis of measurement information from sensors, and automated driving control based on the detection result.

The automated driving ECU 111D periodically or non-periodically transmits mode information indicating the present driving mode, to the vehicle control device 100 via the relay device 211.

For example, the automated driving ECU 111D performs switching from an automated driving mode to a manual driving mode, and switching from the manual driving mode to the automated driving mode, in accordance with an operation by the user of the vehicle 1. When having performed switching of the driving mode, the automated driving ECU 111D transmits, to the vehicle control device 100 via the relay device 211, mode information indicating that switching of the driving mode has been performed.

Specifically, when having performed switching from the automated driving mode to the manual driving mode, the automated driving ECU 111D transmits, to the vehicle control device 100 via the relay device 211, mode information indicating that switching to the manual driving mode has been performed. When having performed switching from the manual driving mode to the automated driving mode, the automated driving ECU 111D transmits, to the vehicle control device 100 via the relay device 211, mode information indicating that switching to the automated driving mode has been performed.

The intake pressure sensor 111E can communicate with another in-vehicle ECU 111 via the relay device 211. The intake pressure sensor 111E periodically measures the intake pressure of the engine in the vehicle 1, and transmits measurement information indicating the measurement result, to the automated driving ECU 111D, for example.

The water temperature sensor 111F can communicate with another in-vehicle ECU 111 via the relay device 211. The water temperature sensor 111F periodically measures the water temperature of cooling water circulating in the engine in the vehicle 1, and transmits measurement information indicating the measurement result, to the automated driving ECU 111D, for example.

The temperature sensor 111G can communicate with another in-vehicle ECU 111 via the relay device 211. The temperature sensor 111G periodically measures the outside air temperature of the vehicle 1, and transmits measurement information indicating the measurement result, to the automated driving ECU 111D, for example.

Each application 212 performs a process of an application layer, for example, thereby performing a predetermined process in the relay device 211 in which the application 212 is installed. Each application 112 performs a process of an application layer, for example, thereby performing a predetermined process in the in-vehicle ECU 111 in which the application 112 is installed. For example, the application 112G in the temperature sensor 111G generates measurement information indicating the outside air temperature of the vehicle 1 in a predetermined cycle.

[Vehicle Control Device]

Figure 3:
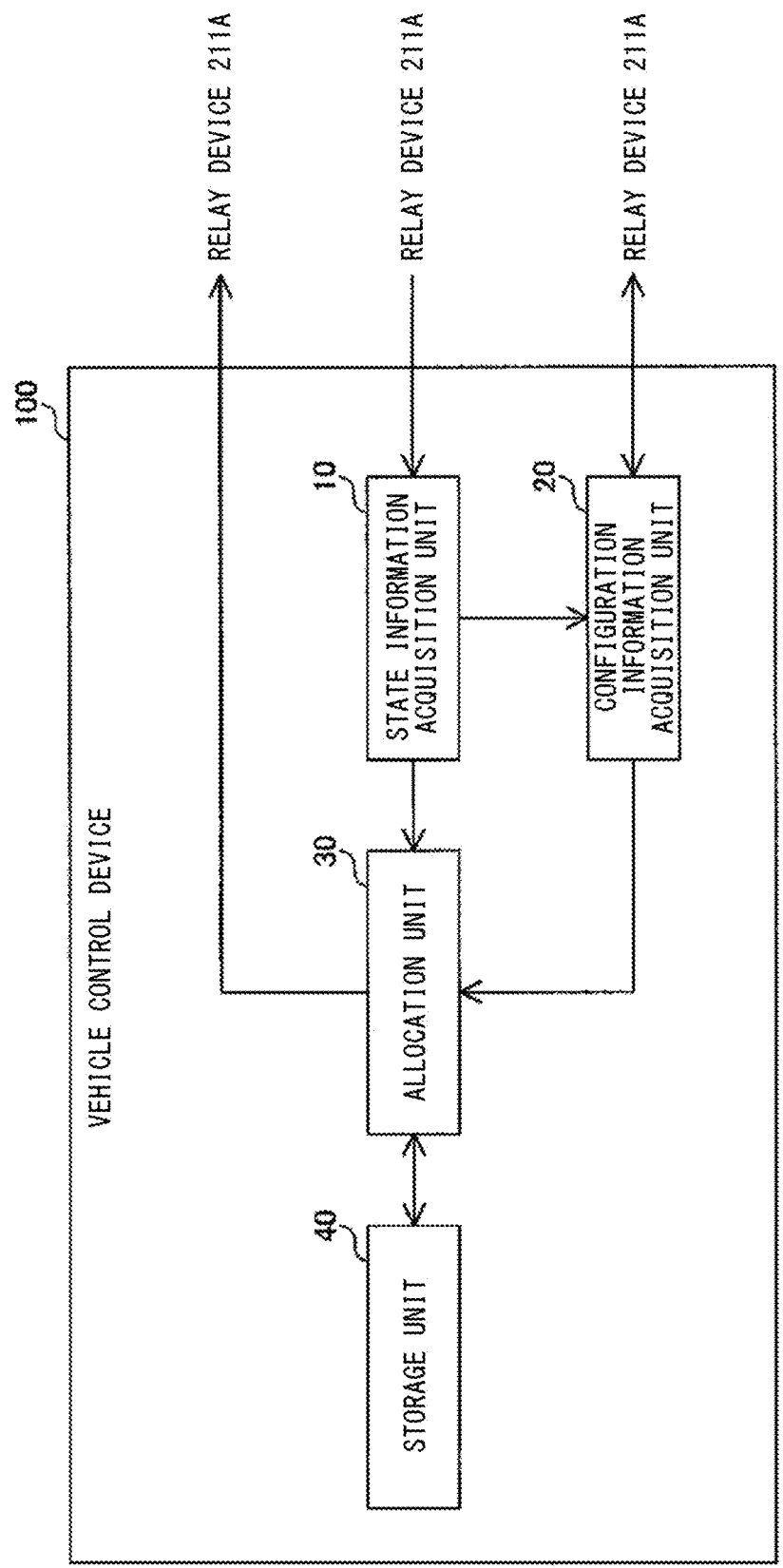
FIG. 3 shows an example of a configuration of a vehicle control device according to the embodiment of the present disclosure.

FIG. 3 shows an example of a configuration of a vehicle control device according to the embodiment of the present disclosure.

With reference to FIG. 3, the vehicle control device 100 includes a state information acquisition unit 10, a configuration information acquisition unit 20, an allocation unit 30, and a storage unit 40. The storage unit 40 is a flash memory, for example.

The state information acquisition unit 10, the configuration information acquisition unit 20, and the allocation unit 30 are realized by processors such as a CPU (Central Processing Unit) and a DSP (Digital Signal Processor), for example.

[State Information Acquisition Unit]

The state information acquisition unit 10 acquires state information indicating the state of the vehicle 1. More specifically, the state information acquisition unit 10 periodically or non-periodically acquires state information of the vehicle 1 in which the in-vehicle network 12 is installed.

For example, as the state information, the state information acquisition unit 10 acquires information that allows determination as to whether or not the vehicle 1 is in a parking state. Specifically, as the state information, the state information acquisition unit 10 receives engine information indicating that switching of the operation state of the engine has been performed, from the engine ECU 111B via the relay device 211A.

Alternatively, as the state information, the state information acquisition unit 10 acquires information that allows determination as to which of the automated driving mode and the manual driving mode the driving mode of the vehicle 1 is. Specifically, as the state information, the state information acquisition unit 10 receives mode information indicating that switching of the driving mode has been performed, from the automated driving ECU 111D via the relay device 211.

Upon receiving the state information, the state information acquisition unit 10 outputs the received state information to the allocation unit 30 and the configuration information acquisition unit 20.

[Configuration Information Acquisition Unit]

The configuration information acquisition unit 20 periodically or non-periodically acquires configuration information regarding the configuration of the in-vehicle network 12.

For example, in accordance with transition of the state of the vehicle 1, the configuration information acquisition unit 20 acquires, as the configuration information, necessary band information indicating a band necessary for communication between function units, for each state of the vehicle 1. More specifically, upon receiving the state information from the state information acquisition unit 10, the configuration information acquisition unit 20 recognizes that the state of the vehicle 1 has been transitioned, and acquires necessary band information indicating a data transfer rate necessary for communication between the transmission source function unit and the transmission destination function unit.

Alternatively, as the configuration information, the configuration information acquisition unit 20 acquires reservation band information indicating transmission bands, i.e., reservation bands, allocated to a plurality of logical paths between function units. More specifically, the configuration information acquisition unit 20 acquires reservation band information indicating the present data transfer rates set to a plurality of logical paths between function units.

Alternatively, as the configuration information, the configuration information acquisition unit 20 acquires function unit information including information regarding the network configuration of a layer of a lower order than the application layer, of each function unit in the in-vehicle network 12.

Specifically, as the function unit information, the configuration information acquisition unit 20 acquires information that allows recognition of at least one of: the specifications of hardware devices such as in-vehicle ECUs 111 and relay devices 211 and the topology of the in-vehicle network 12; restriction regarding the disposition of the applications 112, 212 in the hardware devices in the in-vehicle network 12; and restriction of the communication method in the in-vehicle network 12.

As the information that allows recognition of the specifications of hardware devices and the topology of the in-vehicle network 12, the configuration information acquisition unit 20 acquires at least one type of information from among: for example, information regarding the identifier, the name, the device type indicating a sensor type, etc., the memory size, the number of physical ports provided for each communication protocol, the identifier of each physical port, the power supply configuration, the power consumption, the IDs of VLANs, the subnet address, and the function domain, of each hardware device; information regarding the specification of a CPU or a GPU (Graphics Processing Unit) installed in each hardware device; information regarding the connection relationship between hardware devices; information regarding the bandwidth of communication between hardware devices; and information regarding the specifications of the relay devices 211.

As the information that allows recognition of restriction regarding the disposition of the applications 112, 212 in the hardware devices, the configuration information acquisition unit 20 acquires at least one type of information from among, for example, pieces of information regarding the calculation speed necessary for execution, the memory use amount, restriction of the OS (Operating System) environment, and restriction of the communication protocol such as TCP (Transmission Control Protocol) and UDP (User Datagram Protocol), of the applications 112, 212.

As information that allows recognition of the restriction of the communication method in the in-vehicle network 12, the configuration information acquisition unit 20 acquires at least one type of information from among pieces of information regarding: the communication data size; the communication frequency; necessity or unnecessity of burst transmission; the allowable delay time; the allowable amount of loss; the required security level; operation timing; the communication type indicating, e.g., periodic communication or non-periodic communication; the identifier of the application 112, 212 to serve as a communication counterpart; and the messaging system indicating a request-response type, a publish-subscribe type, or the like, of each application 112, 212; as well as the priority of communication by the application 112, 212.

The configuration information acquisition unit 20 specifies one or a plurality of types of configuration information that are necessary for an allocation process in the allocation unit 30 described later, out of the types of configuration information as described above. Hereinafter, each of the one or plurality of types of configuration information specified by the configuration information acquisition unit 20 will also be referred to as target information.

The configuration information acquisition unit 20 transmits, to each function unit in the in-vehicle network 12, information request notification indicating that target information should be transmitted.

As a response to the information request notification received from the configuration information acquisition unit 20, each function unit transmits, to the configuration information acquisition unit 20, its own configuration information of the type designated by the information request notification, for example.

The configuration information acquisition unit 20 outputs the configuration information acquired as described above, to the allocation unit 30.

[Allocation Unit]

The allocation unit 30 changes allocation of the transmission bands of a plurality of logical paths between function units in accordance with the state of the vehicle 1 indicated by the state information acquired by the state information acquisition unit 10.

More specifically, upon receiving the state information from the state information acquisition unit 10, the allocation unit 30 determines a transmission band to be allocated to each of a plurality of logical paths between function units. For example, the allocation unit 30 allocates a transmission band that is greater than zero, to all of the logical paths.

Then, the allocation unit 30 transmits, to one or a plurality of function units, band setting information indicating the allocation content of the determined transmission bands. More specifically, the allocation unit 30 selectively transmits band setting information to a function unit for which the setting of the transmission band should be changed.

When the function unit has received the band setting information from the allocation unit 30, the function unit performs setting of the transmission band of one or a plurality of logical paths in accordance with the received band setting information, and transmits data by using the logical paths.

Specifically, the allocation unit 30 changes the shaping rate of CBS (Credit Based Shaper) according to the IEEE802.1Qav standard or TAS (Time Aware Shaper) according to the IEEE802.1Qbv standard in a plurality of logical paths between function units, thereby changing the allocation of the transmission band of each logical path.

The allocation unit 30 transmits band setting information indicating the shaping rate after the change, to one or a plurality of function units.

Upon receiving the band setting information from the allocation unit 30, each function unit performs setting of the shaping rate in accordance with the received band setting information, thereby performing setting of the transmission band of one or a plurality of logical paths.

(Transmission Band Allocation Example 1)

With reference to FIG. 2 again, for example, when the OTA master 111C has received an update program for the automated driving ECU 111D from the server 180 via the TCU 111A and the relay device 211A, the OTA master 111C transmits the received update program to the automated driving ECU 111D via the relay device 211A.

Figure 4:
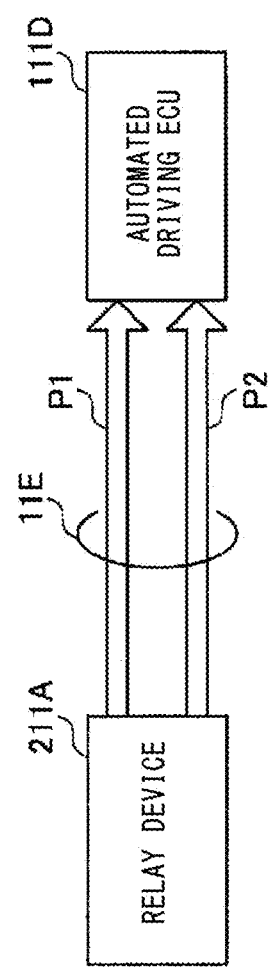
FIG. 4 shows an example of logical paths between in-vehicle devices in the in-vehicle system according to the embodiment of the present disclosure.

FIG. 4 shows an example of logical paths between in-vehicle devices in the in-vehicle system according to the embodiment of the present disclosure. FIG. 4 shows logical paths in the Ethernet cable 11E between the relay device 211A and the automated driving ECU 111D. Here, the transmission capacity of the Ethernet cable 11E is 1000 Mbps, for example.

With reference to FIG. 4, the relay device 211A transmits data to the automated driving ECU 111D by using logical paths P1, P2 in the Ethernet cable 11E.

More specifically, the relay device 211A transmits an update program from the OTA master 111C, to the automated driving ECU 111D by using the logical path P1, and transmits data and the like from, for example, the engine ECU 111B other than the update program from the OTA master 111C, to the automated driving ECU 111D by using the logical path P2.

With reference to FIG. 3 again, for example, when the allocation unit 30 has received state information from the state information acquisition unit 10, the allocation unit 30 determines a transmission band to be allocated to each of the logical paths P1, P2 between the relay device 211A and the automated driving ECU 111D.

For example, the storage unit 40 stores a pattern table indicating allocation patterns of transmission bands of respective logical paths for each state of the vehicle 1.

FIG. 5 shows an example of a pattern table stored in the storage unit in the vehicle control device according to the embodiment of the present disclosure. FIG. 5 shows a pattern table PT1 indicating allocation patterns of transmission bands of the logical paths P1, P2 for each operation state of the engine of the vehicle 1.

With reference to FIG. 5, the pattern table PT1 in the storage unit 40 shows that: in an allocation pattern A to be used when the engine is in a drive state, transmission bands of 300 Mbps and 700 Mbps should be allocated to the logical path P1 and the logical path P2, respectively; and in an allocation pattern B to be used when the engine is in a stop state, transmission bands of 900 Mbps and 100 Mbps should be allocated to the logical path P1 and the logical path P2, respectively.

With reference to FIG. 3 and FIG. 5, the allocation unit 30 determines an allocation content of the transmission band of each logical path between function units in accordance with the allocation pattern corresponding to the state of the vehicle 1.

More specifically, when the allocation unit 30 has received engine information from the engine ECU 111B via the state information acquisition unit 10, the allocation unit 30 refers to the pattern table PT1 in the storage unit 40, and determines allocation contents of the transmission bands of the logical paths P1, P2 in accordance with the allocation pattern corresponding to the operation state of the engine.

Specifically, when the allocation unit 30 has received engine information indicating that the operation state of the engine has been switched to the drive state, the allocation unit 30 refers to the pattern table PT1 in the storage unit 40, and determines to allocate transmission bands of 300 Mbps and 700 Mbps to the logical path P1 and the logical path P2, respectively, in accordance with the allocation pattern A.

When the allocation unit 30 has received engine information indicating that the operation state of the engine has been switched to the stop state, the allocation unit 30 refers to the pattern table PT1 in the storage unit 40, and determines to allocate transmission bands of 900 Mbps and 100 Mbps to the logical path P1 and the logical path P2, respectively, in accordance with the allocation pattern B.

Upon determining the allocation contents of the transmission bands of the logical paths P1, P2, the allocation unit 30 transmits band setting information indicating the determined transmission bands, to the relay device 211A.

Upon receiving the band setting information from the allocation unit 30, the relay device 211A changes the settings of the transmission bands of the logical paths P1, P2 in accordance with the received band setting information, and transmits data to the automated driving ECU 111D by using the logical paths P1, P2 after the setting change.

(Transmission Band Allocation Example 2)

Figure 6:
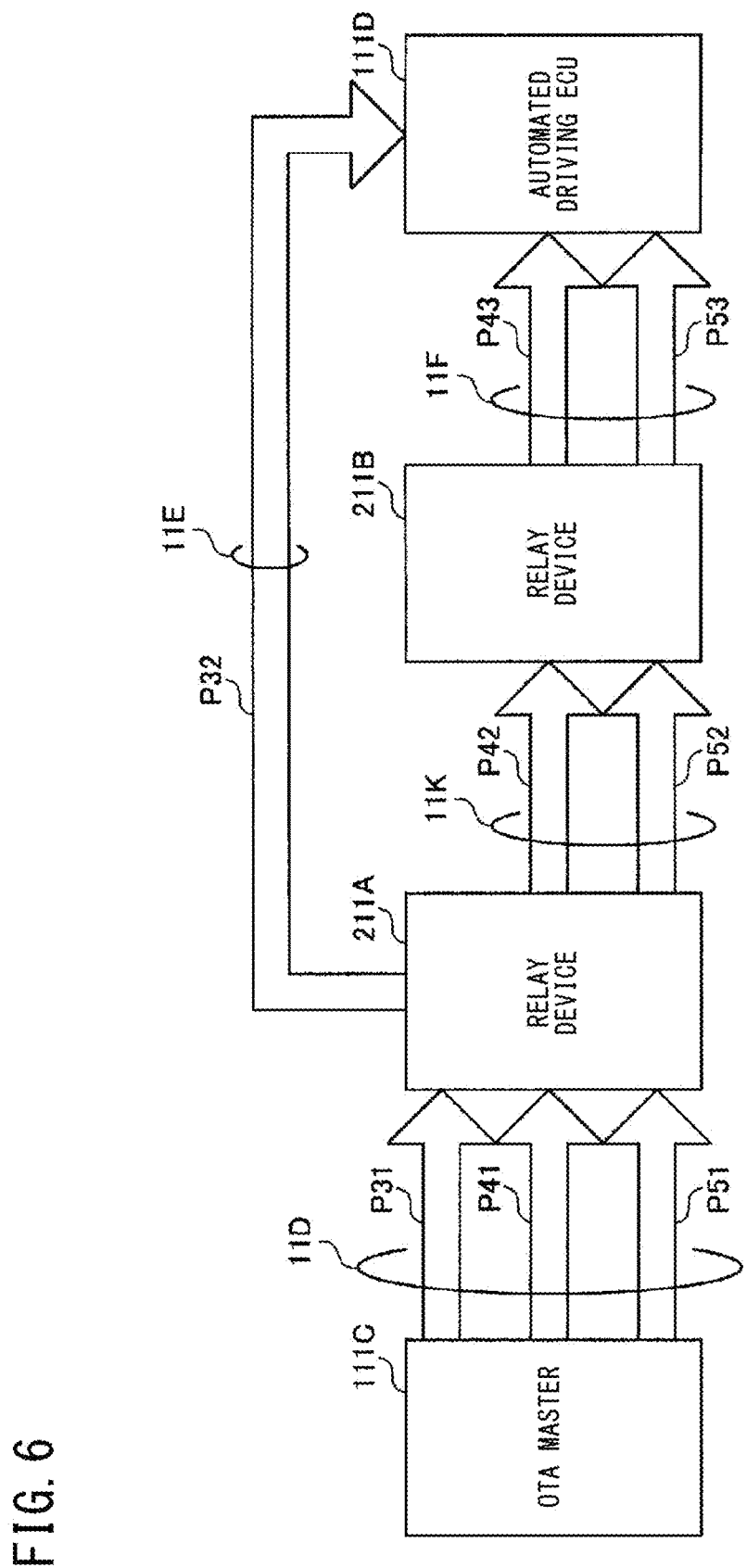
FIG. 6 shows another example of logical paths between in-vehicle devices in the in-vehicle system according to the embodiment of the present disclosure.

FIG. 6 shows another example of logical paths between in-vehicle devices in the in-vehicle system according to the embodiment of the present disclosure. FIG. 6 shows logical paths in the Ethernet cables 11D, 11E, 11F, 11K between the OTA master 111C and the automated driving ECU 111D. Here, the transmission capacity of each of the Ethernet cables 11D, 11E, 11F, 11K is 1000 Mbps, for example.

With reference to FIG. 6, the OTA master 111C transmits an update program to the automated driving ECU 111D, by using any one of a logical path P3 composed of logical paths P31, P32, a logical path P4 composed of logical paths P41, P42, P43, and a logical path P5 composed of logical paths P51, P52, P53.

For example, the logical paths P3, P4, P5 are each realized by a plurality of physical transmission paths which are in the form of branches extending from the relay device 211A to the relay device 211B and the automated driving ECU 111D.

More specifically, the logical paths P4, P5 are each realized by a plurality of transmission paths including a first transmission path and a second transmission path each being a physical transmission path. The logical path P3 is realized by a plurality of transmission paths including the first transmission path and a third transmission path each being a physical transmission path.

Specifically, the logical paths P4, P5 are each realized by the Ethernet cables 11D, 11K, 11F which respectively connect the OTA master 111C and the relay device 211A, the relay device 211A and the relay device 211B, and the relay device 211B and the automated driving ECU 111D. The logical path P3 is realized by the Ethernet cables 11D, 11E which respectively connect the OTA master 111C and the relay device 211A, and the relay device 211A and the automated driving ECU 111D. The logical paths P4, P5 are examples of a first logical path. The logical path P3 is an example of a second logical path. The Ethernet cable 11D is an example of the first transmission path. The Ethernet cables 11K, 11F are examples of the second transmission path. The Ethernet cable 11E is an example of a third transmission path.

For example, when the configuration information acquisition unit 20 has received engine information from the engine ECU 111B via the state information acquisition unit 10, the configuration information acquisition unit 20 acquires configuration information from each function unit. Then, the configuration information acquisition unit 20 outputs the acquired configuration information to the allocation unit 30. For example, as the configuration information, the configuration information acquisition unit 20 acquires necessary band information and reservation band information of each logical path in the in-vehicle network 12, and outputs the acquired necessary band information and reservation band information to the allocation unit 30.

Figure 7:
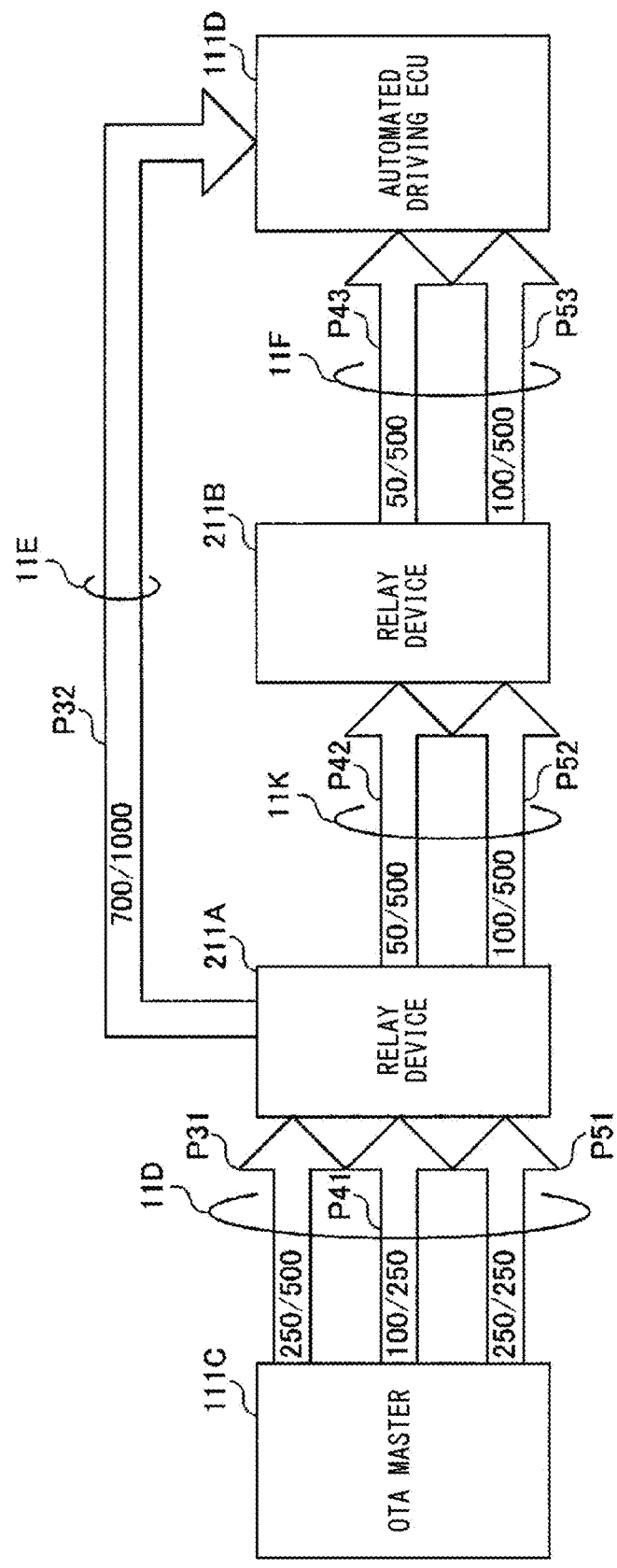
FIG. 7 shows an example of logical paths between in-vehicle devices in the in-vehicle system according to the embodiment of the present disclosure.

FIG. 7 shows an example of logical paths between in-vehicle devices in the in-vehicle system according to the embodiment of the present disclosure. In the drawings in FIG. 7 to FIG. 12, as for the numerical values indicated in each arrow in each logical path, the denominator represents a reservation band, the numerator represents a free band, and the unit is Mbps.

On the basis of the necessary band information and the reservation band information received from the configuration information acquisition unit 20, the allocation unit 30 specifies a logical path that has the greatest usable transmission band out of the logical path P3 composed of the logical paths P31, P32, the logical path P4 composed of the logical paths P41, P42, P43, and the logical path P5 composed of the logical paths P51, P52, P53.

More specifically, out of the logical path P3, the logical path P4, and the logical path P5, the allocation unit 30 specifies a maximum logical path which is the logical path that has the greatest value of the minimum values of the free bands of the logical paths between function units.

Specifically, with reference to FIG. 7, since the free band of the logical path P31 is 250 Mbps and the free band of the logical path P32 is 700 Mbps, the transmission band usable in the logical path P3 is 250 Mbps.

Since the free band of the logical path P41 is 100 Mbps, the free band of the logical path P42 is 50 Mbps, and the free band of the logical path P43 is 50 Mbps, the transmission band usable in the logical path P4 is 50 Mbps.

Since the free band of the logical path P51 is 250 Mbps, the free band of the logical path P52 is 100 Mbps, and the free band of the logical path P53 is 100 Mbps, the transmission band usable in the logical path P5 is 100 Mbps.

Therefore, the allocation unit 30 specifies the logical path P3 as the maximum logical path in the present state of the vehicle 1.

As described above, every time the state of the vehicle 1 has been transitioned, the allocation unit 30 specifies a maximum logical path in the new state of the vehicle 1.

Then, in a certain state of the vehicle 1, when the OTA master 111C has received an update program for the automated driving ECU 111D from the server 180 via the TCU 111A and the relay device 211A, the OTA master 111C transmits, to the vehicle control device 100, request band information indicating a transmission band necessary for transmission of the update program to the automated driving ECU 111D.

The allocation unit 30 in the vehicle control device 100 compares the transmission band indicated by the request band information received from the OTA master 111C, with the transmission band usable in the logical path P3 which is the maximum logical path in the present state of the vehicle 1. When the transmission band usable in the logical path P3 is greater than the transmission band indicated by the request band information, the allocation unit 30 transmits, to the OTA master 111C, selection path information indicating that communication should be performed by using the logical path P3.

Upon receiving the selection path information from the allocation unit 30, the OTA master 111C transmits, to the automated driving ECU 111D, the update program by using the logical path P3 in accordance with the received selection path information.

Meanwhile, when the allocation unit 30 in the vehicle control device 100 compares the transmission band indicated by the request band information received from the OTA master 111C with the transmission band usable in the logical path P3, and the transmission band usable in the logical path P3 is smaller than the transmission band indicated by the request band information, the allocation unit 30 changes allocation of the transmission bands of the logical paths P3, P4, P5.

For example, on the basis of the configuration information, e.g., the necessary band information, acquired by the configuration information acquisition unit 20, and the state information acquired by the state information acquisition unit 10, the allocation unit 30 determines allocation contents of the transmission bands of the logical paths P3, P4, P5 between function units.

Figure 8:
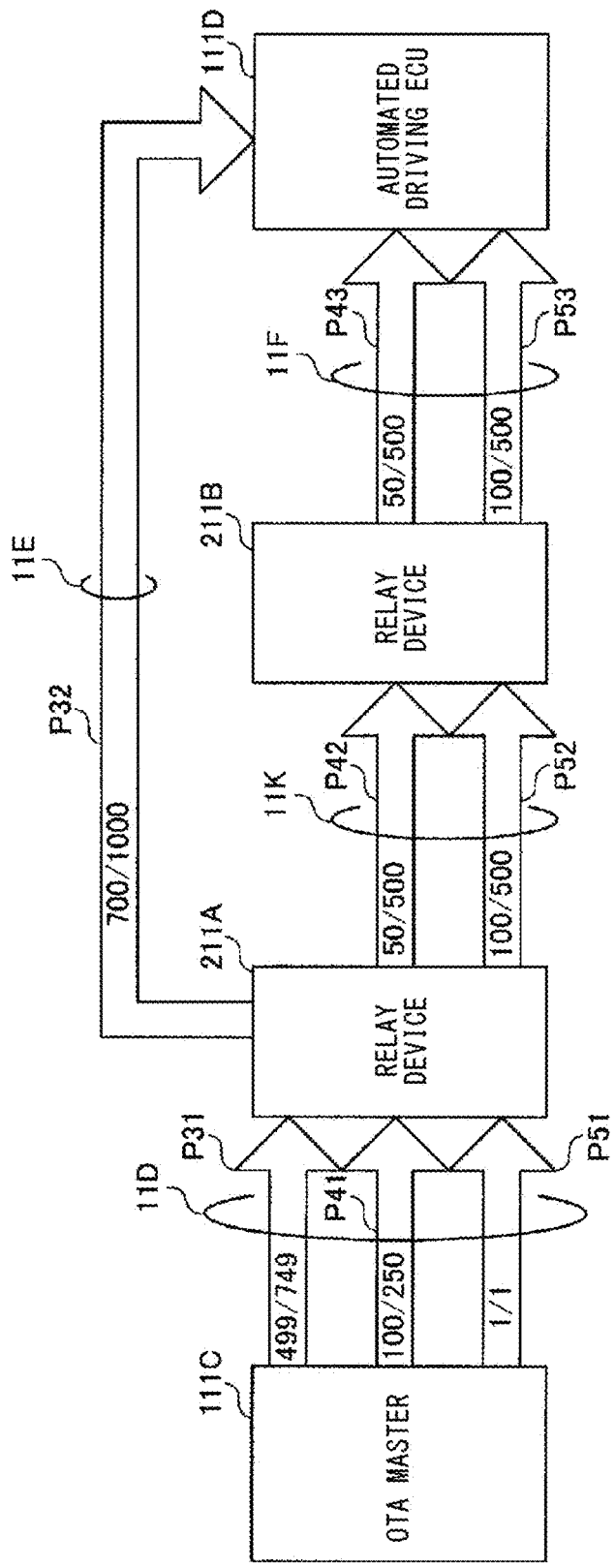
FIG. 8 shows an example of logical paths between in-vehicle devices in the in-vehicle system according to the embodiment of the present disclosure.

FIG. 8 shows an example of logical paths between in-vehicle devices in the in-vehicle system according to the embodiment of the present disclosure.

For example, the allocation unit 30 changes allocation of the transmission bands of the logical paths P3, P4, P5 such that the transmission band usable in the logical path P3 which is the maximum logical path in the present state of the vehicle 1 is greater than the transmission band indicated by the request band information received from the OTA master 111C.

For example, with reference to FIG. 8, the allocation unit 30 changes the reservation band of the logical path P51 from 250 Mbps to 1 Mbps, and changes the reservation band of the logical path P31 from 500 Mbps to 749 Mbps. That is, the allocation unit 30 further allocates a transmission band of 249 Mbps having been allocated to the logical path P51, to the logical path P31.

Since the transmission band usable in the logical path P3 after the transmission band allocation has been changed has become greater than the transmission band indicated by the request band information, the allocation unit 30 transmits, to the OTA master 111C, band setting information indicating that allocation of the transmission bands of the logical paths P31, P51 should be changed.

Upon receiving the band setting information from the allocation unit 30, the OTA master 111C changes the settings of the transmission bands of the logical paths P31, P51 in accordance with the received band setting information, and transmits the update program to the automated driving ECU 111D by using the logical path P3 after the setting change.

For example, when the transmission of the update program to the automated driving ECU 111D has been completed, the OTA master 111C returns the settings of the transmission bands of the logical paths P31, P51 to the state before the change.

(Transmission Band Allocation Example 3)

Here, there are cases where a new function unit is added to the in-vehicle network 12. When a new function unit has been added to the in-vehicle network 12, allocation of the transmission band of each logical path between in-vehicle ECUs is changed, for example.

Figure 9:
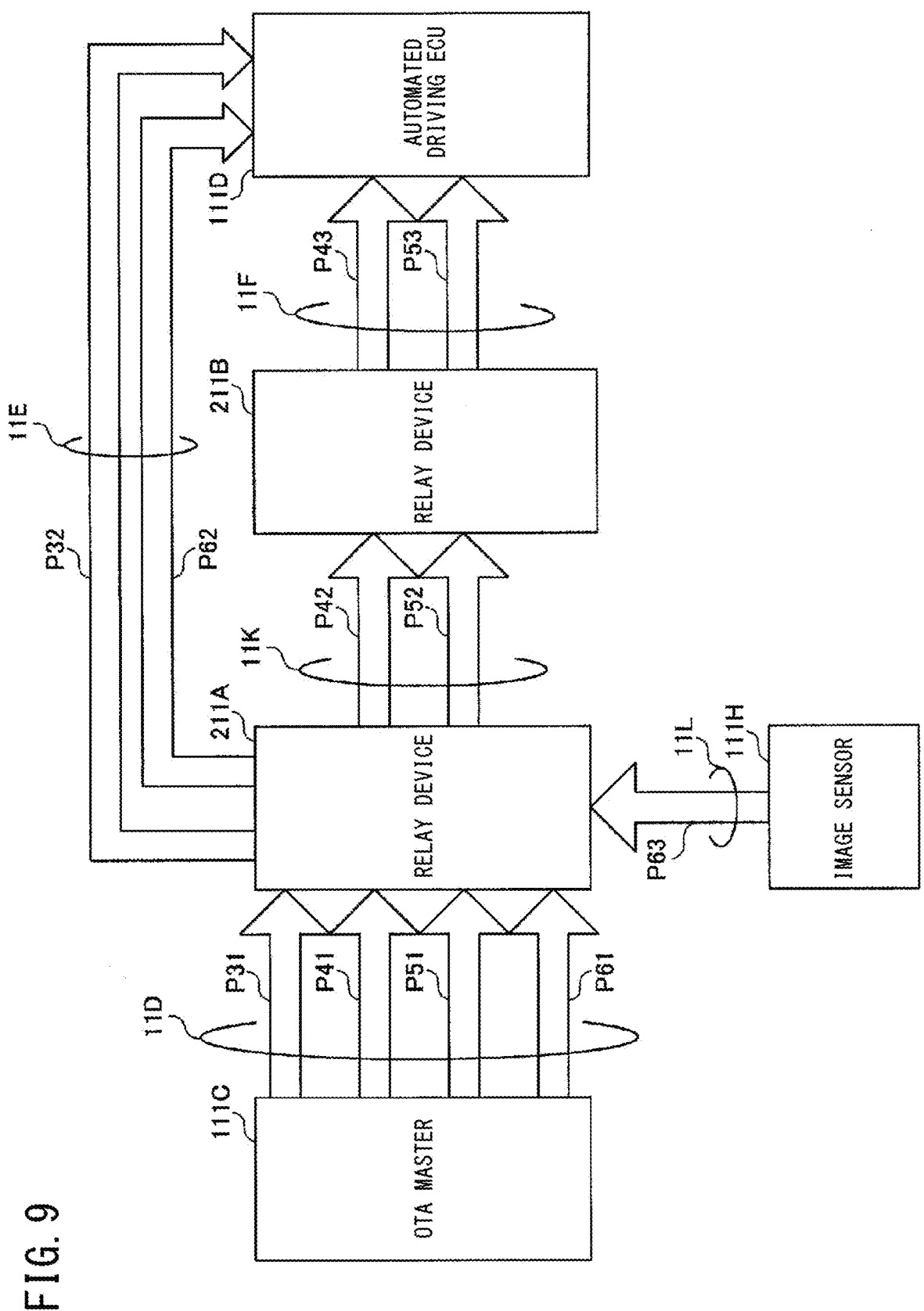
FIG. 9 shows another example of logical paths between in-vehicle devices in the in-vehicle system according to the embodiment of the present disclosure.

FIG. 9 shows another example of logical paths between in-vehicle devices in the in-vehicle system according to the embodiment of the present disclosure. FIG. 9 shows an example in which an image sensor 111H being a new function unit has been connected to the relay device 211A via an Ethernet cable 11L in the in-vehicle network 12. The transmission capacity of the Ethernet cable 11L is 1000 Mbps, for example.

As described above, when the configuration information acquisition unit 20 has received state information from the state information acquisition unit 10, the configuration information acquisition unit 20 acquires necessary band information and reservation band information and outputs these pieces of information to the allocation unit 30.

Figure 10:
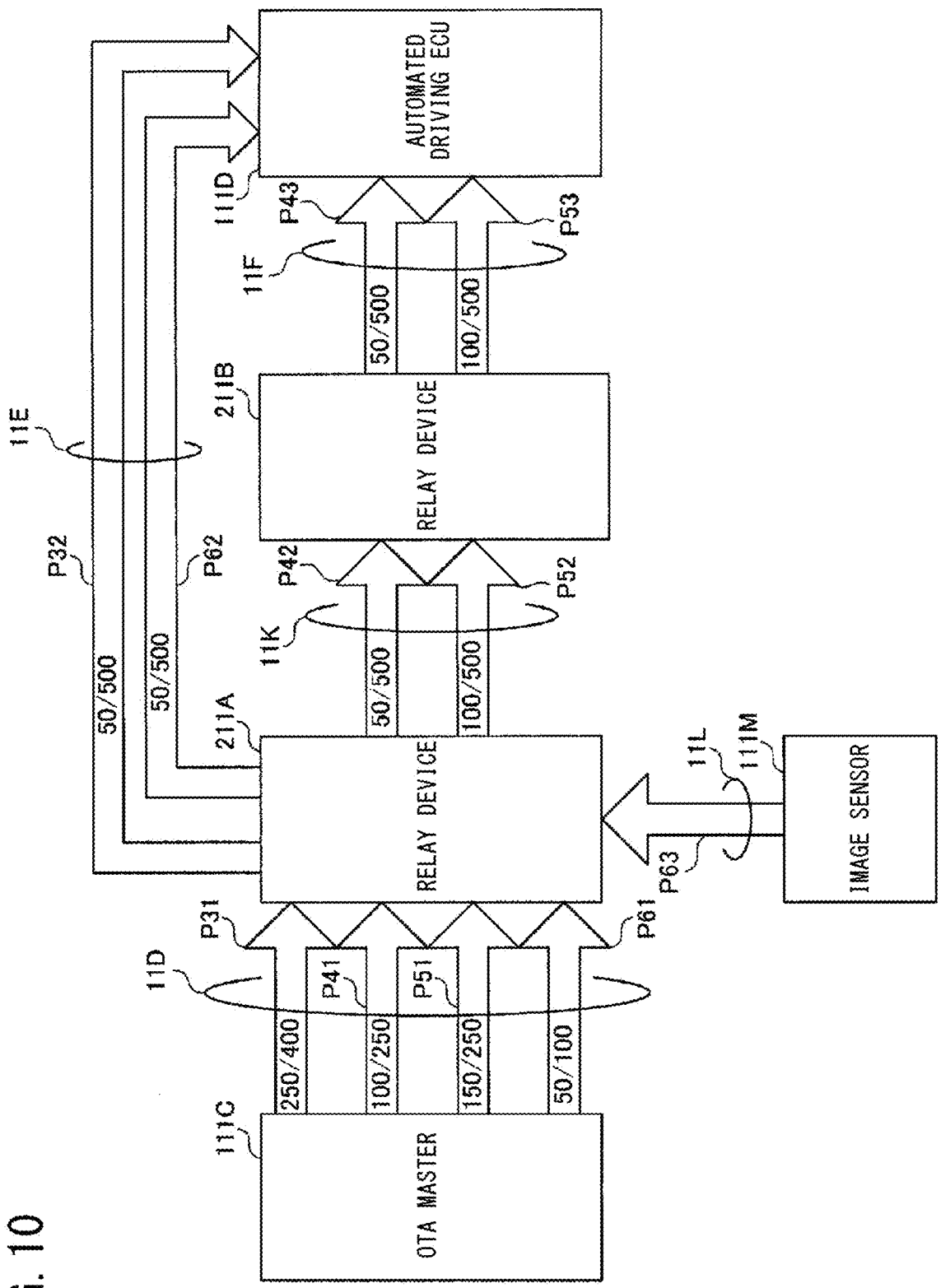
FIG. 10 shows another example of logical paths between in-vehicle devices in the in-vehicle system according to the embodiment of the present disclosure.

FIG. 10 shows another example of logical paths between in-vehicle devices in the in-vehicle system according to the embodiment of the present disclosure.

On the basis of the necessary band information and the reservation band information received from the configuration information acquisition unit 20, the allocation unit 30 specifies a logical path that has the greatest usable transmission band out of the logical path P3 composed of the logical paths P31, P32, the logical path P4 composed of the logical paths P41, P42, P43, the logical path P5 composed of the logical paths P51, P52, P53, and a logical path P6 composed of logical paths P61, P62.

Specifically, with reference to FIG. 10, since the free band of the logical path P31 is 250 Mbps and the free band of the logical path P32 is 50 Mbps, the transmission band usable in the logical path P3 is 50 Mbps.

Since the free band of the logical path P41 is 100 Mbps, the free band of the logical path P42 is 50 Mbps, and the free band of the logical path P43 is 50 Mbps, the transmission band usable in the logical path P4 is 50 Mbps.

Since the free band of the logical path P51 is 150 Mbps, the free band of the logical path P52 is 100 Mbps, and the free band of the logical path P53 is 100 Mbps, the transmission band usable in the logical path P5 is 100 Mbps.

Since the free band of the logical path P61 is 50 Mbps and the free band of the logical path P62 is 50 Mbps, the transmission band usable in the logical path P6 is 50 Mbps.

Therefore, the allocation unit 30 specifies the logical path P5 as the maximum logical path in the present state of the vehicle 1.

As described above, when the transmission band usable in the logical path P5 being the maximum logical path in the present state of the vehicle 1 is greater than the transmission band indicated by the request band information received from the OTA master 111C, the allocation unit 30 in the vehicle control device 100 transmits, to the OTA master 111C, selection path information indicating that communication should be performed by using the logical path P5.

Meanwhile, when the transmission band usable in the logical path P5 is smaller than the transmission band indicated by the request band information, the allocation unit 30 in the vehicle control device 100 changes allocation of the transmission bands of the logical paths P3, P4, P5, P6.

(Transmission Band Allocation Example 4)

With reference to FIG. 2 again, the automated driving ECU 111D receives measurement information from the intake pressure sensor 111E, the water temperature sensor 111F, and the temperature sensor 111G via the relay device 211B, for example. Then, the automated driving ECU 111D performs detection of the traveling state of the vehicle 1 on the basis of the received measurement information, and automated driving control based on the detection result. That is, the automated driving ECU 111D is assumed to be operating in the automated driving mode.

Figure 11:
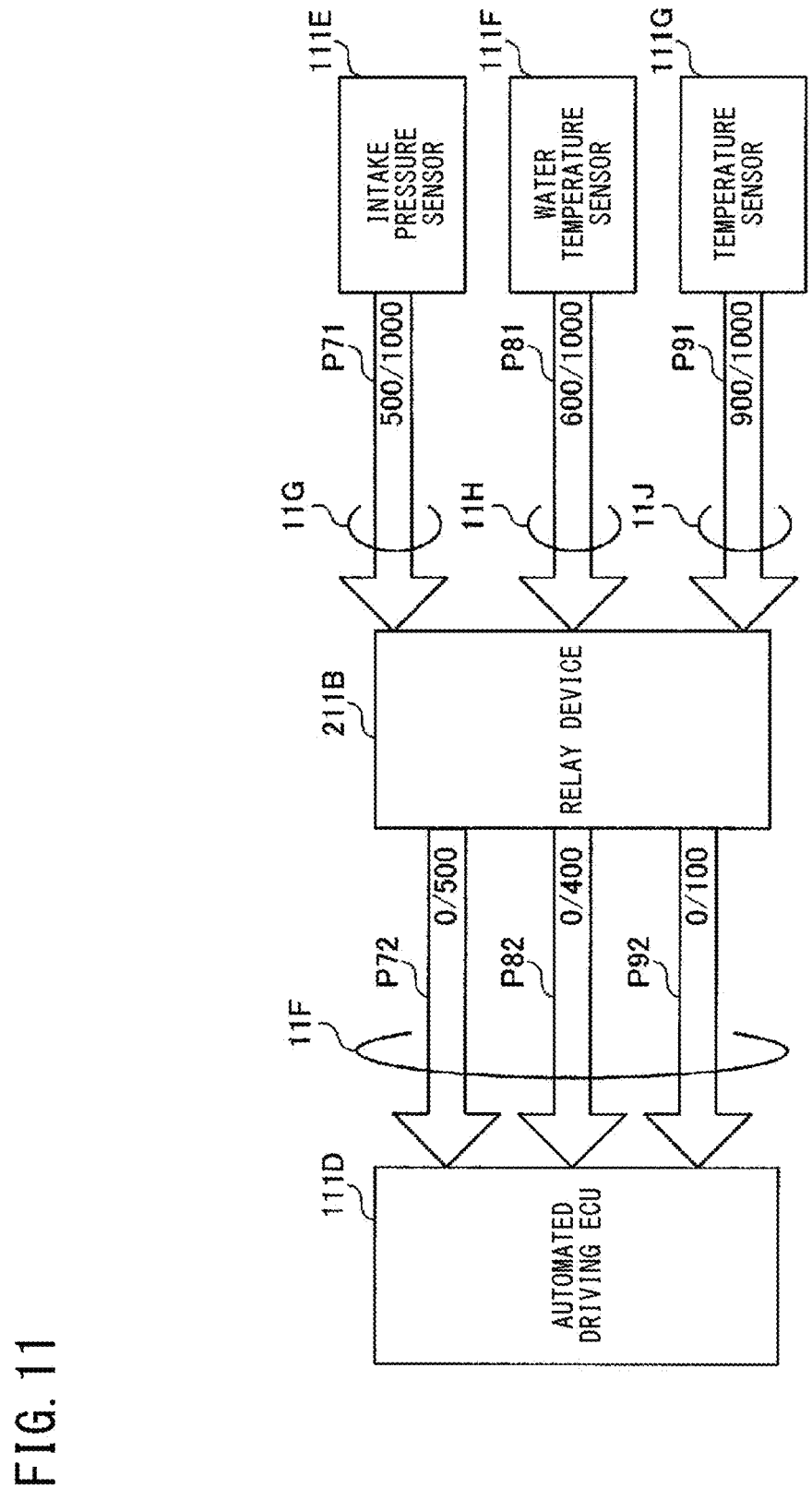
FIG. 11 shows another example of logical paths between in-vehicle devices in the in-vehicle system according to the embodiment of the present disclosure.

FIG. 11 shows another example of logical paths between in-vehicle devices in the in-vehicle system according to the embodiment of the present disclosure. FIG. 11 shows the logical path in the Ethernet cable 11G between the intake pressure sensor 111E and the relay device 211B, the logical path in the Ethernet cable 11H between the water temperature sensor 111F and the relay device 211B, the logical path in the Ethernet cable 11J between the temperature sensor 111G and the relay device 211B, and the logical paths in the Ethernet cable 11F between the relay device 211B and the automated driving ECU 111D. Here, the transmission capacity of each of the Ethernet cables 11F, 11G, 11H, 11J is 1000 Mbps, for example.

With reference to FIG. 11, the intake pressure sensor 111E transmits measurement information to the automated driving ECU 111D by using a logical path P7 composed of logical paths P71, P72.

The water temperature sensor 111F transmits measurement information to the automated driving ECU 111D by using a logical path P8 composed of logical paths P81, P82.

The temperature sensor 111G transmits measurement information to the automated driving ECU 111D by using a logical path P9 composed of logical paths P91, P92.

With reference to FIG. 3 and FIG. 11, for example, the configuration information acquisition unit 20 periodically acquires configuration information. For example, as the configuration information, the configuration information acquisition unit 20 periodically acquires necessary band information and reservation band information of each logical path in the in-vehicle network 12, and outputs the acquired necessary band information and reservation band information to the allocation unit 30.

As shown in FIG. 11, on the basis of the necessary band information and the reservation band information received from the configuration information acquisition unit 20, the allocation unit 30 recognizes that the reservation band of the logical path P72 is 500 Mbps, the reservation band of the logical path P82 is 400 Mbps, the reservation band of the logical path P92 is 100 Mbps, and the free bands of the logical paths P72, P82, P92 are zero, for example.

Then, for example, when the configuration information acquisition unit 20 has received, as the state information, mode information indicating that switching to the manual driving mode has been performed, from the state information acquisition unit 10, the configuration information acquisition unit 20 acquires configuration information from each function unit, and outputs the acquired configuration information to the allocation unit 30. For example, as the configuration information, the configuration information acquisition unit 20 acquires necessary band information and reservation band information of the logical paths P7, P8, P9, and outputs the acquired necessary band information and reservation band information to the allocation unit 30.

For example, when the allocation unit 30 has acquired necessary band information indicating that a band of 10 Mbps is necessary for the logical path P72, a band of 10 Mbps is necessary for the logical path P82, and a band of 700 Mbps is necessary for the logical path P92, the allocation unit 30 changes allocation of the transmission bands of the logical paths P7, P8, P9 on the basis of the acquired necessary band information.

Figure 12:
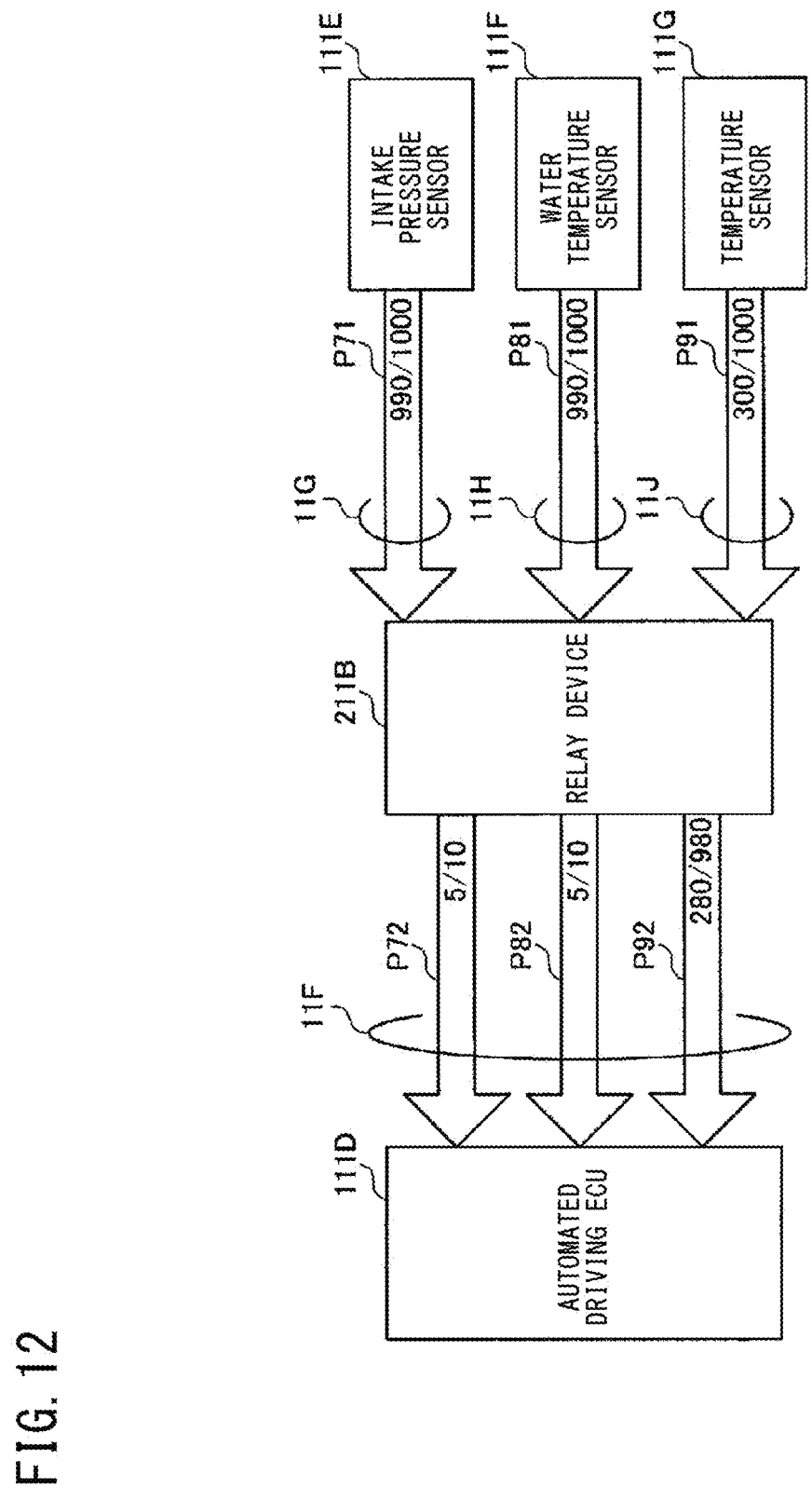
FIG. 12 shows an example of logical paths between in-vehicle devices in the in-vehicle system according to the embodiment of the present disclosure.

FIG. 12 shows an example of logical paths between in-vehicle devices in the in-vehicle system according to the embodiment of the present disclosure.

For example, the allocation unit 30 changes allocation of the transmission bands of the logical paths P72, P82, P92 such that the reservation band of the logical path P72 is not less than 10 Mbps, the reservation band of the logical path P82 is not less than 10 Mbps, and the reservation band of the logical path P92 is not less than 700 Mbps.

For example, with reference to FIG. 12, the allocation unit 30 changes the reservation band of the logical path P72 from 500 Mbps to 10 Mbps, changes the reservation band of the logical path P82 from 400 Mbps to 10 Mbps, and changes the reservation band of the logical path P92 from 100 Mbps to 980 Mbps. That is, the allocation unit 30 further allocates a transmission band of 490 Mbps having been allocated to the logical path P72 and a transmission band of 390 Mbps having been allocated to the logical path P82, to the logical path P92.

Then, since the transmission bands usable in the logical paths P72, P82, P92 after the transmission band allocation has been changed has become greater than the transmission bands indicated by the necessary band information, the allocation unit 30 transmits, to the relay device 211B, band setting information indicating that allocation of the transmission bands of the logical paths P72, P82, P92 should be changed.

Upon receiving the band setting information from the allocation unit 30, the relay device 211B changes the settings of the transmission bands in accordance with the received band setting information, and transmits measurement information from the respective sensors to the automated driving ECU 111D by using the logical paths P72, P82, P92 after the setting change.

[Operation Flow]

Each device in the in-vehicle system 300 includes a computer that includes a memory. An arithmetic processing unit such as a CPU in the computer reads out, from the memory, a program including a part or all of steps in the flow charts and sequences shown below, and executes the program. Programs of the plurality of devices can each be installed from outside. The programs of the plurality of devices are each distributed in a state of being stored in a storage medium.

Figure 13:
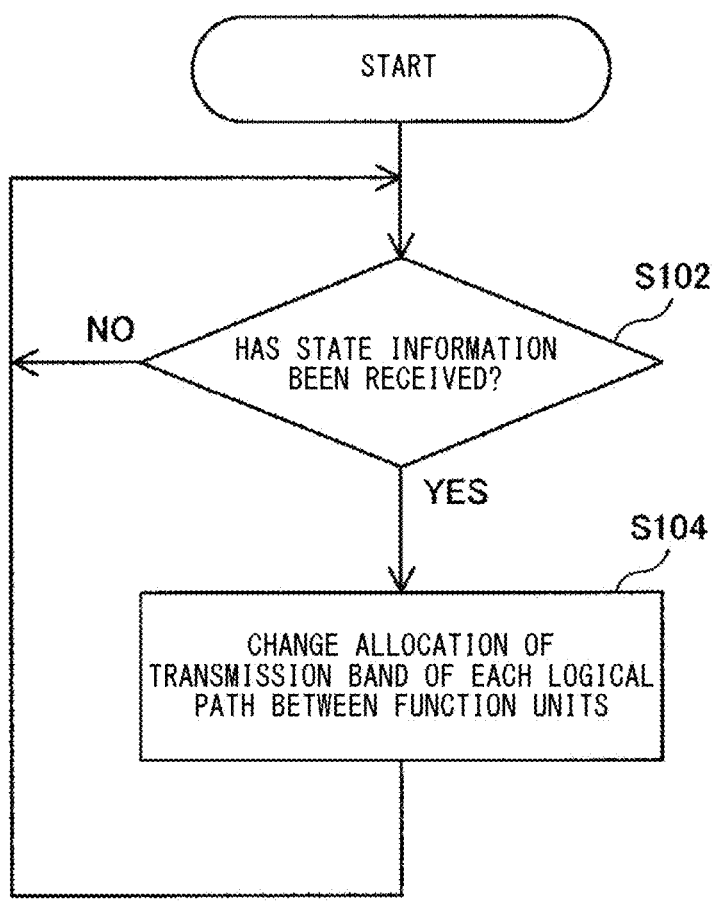
FIG. 13 is a flow chart describing an example of an operation procedure according to which the vehicle control device changes allocation of transmission bands of logical paths in the in-vehicle system according to the embodiment of the present disclosure.

FIG. 13 is a flow chart describing an example of an operation procedure according to which the vehicle control device changes allocation of transmission bands of logical paths in the in-vehicle system according to the embodiment of the present disclosure.

With reference to FIG. 13, first, the vehicle control device 100 waits for state information from function units in the in-vehicle network 12 (NO in step S102). Upon receiving state information (YES in step S102), the vehicle control device 100 changes allocation of transmission bands of a plurality of logical paths between function units in accordance with the state of the vehicle 1 indicated by the received state information. More specifically, in accordance with an allocation pattern, in the pattern table PT1 in the storage unit 40, that corresponds to the state of the vehicle 1, the vehicle control device 100 determines an allocation content of the transmission band of each logical path between function units (step S104).

Next, the vehicle control device 100 waits for new state information from function units (NO in step S102).

Figure 14:
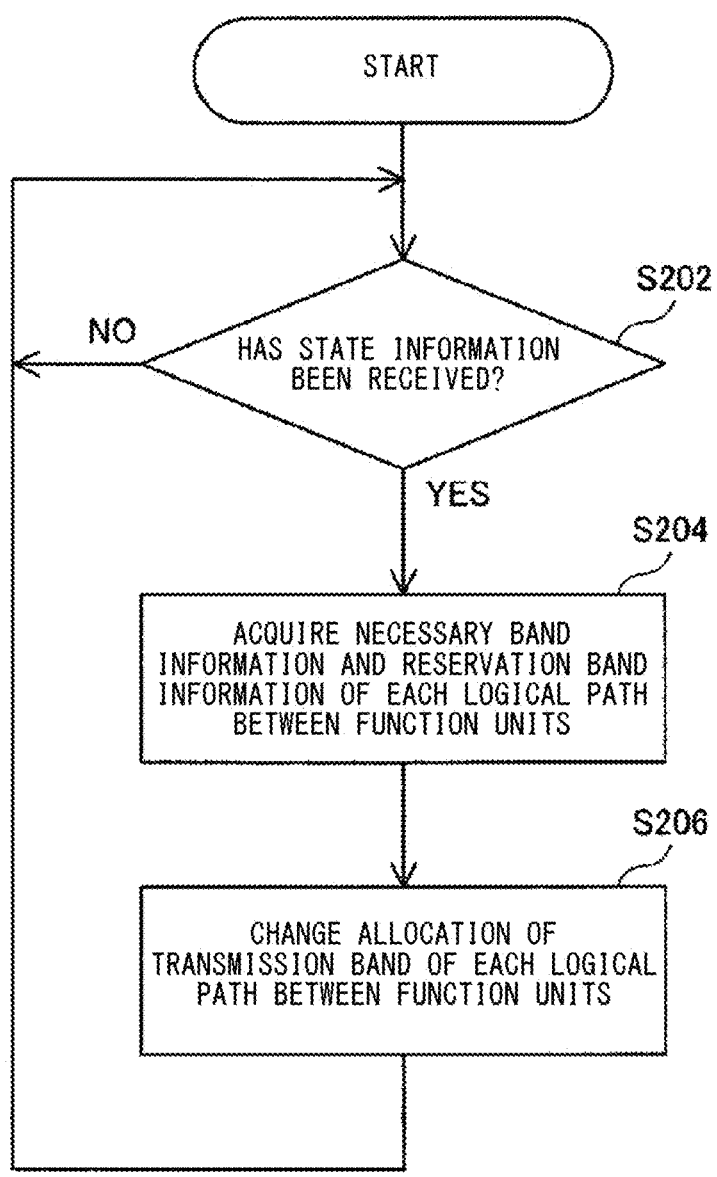
FIG. 14 is a flow chart describing another example of an operation procedure according to which the vehicle control device changes allocation of transmission bands of logical paths in the in-vehicle system according to the embodiment of the present disclosure.

FIG. 14 is a flow chart describing another example of an operation procedure according to which the vehicle control device changes allocation of transmission bands of logical paths in the in-vehicle system according to the embodiment of the present disclosure.

With reference to FIG. 14, first, the vehicle control device 100 waits for state information from function units in the in-vehicle network 12 (NO in step S202). Upon receiving state information (YES in step S202), the vehicle control device 100 acquires necessary band information and reservation band information of each logical path between function units (step S204).

Next, the vehicle control device 100 changes allocation of transmission bands of a plurality of logical paths between function units. More specifically, the vehicle control device 100 determines an allocation content of the transmission band of each logical path between function units on the basis of the necessary band information, the reservation band information, and the state information (step S206).

Next, the vehicle control device 100 waits for new state information from function units (NO in step S202).

Figure 15:
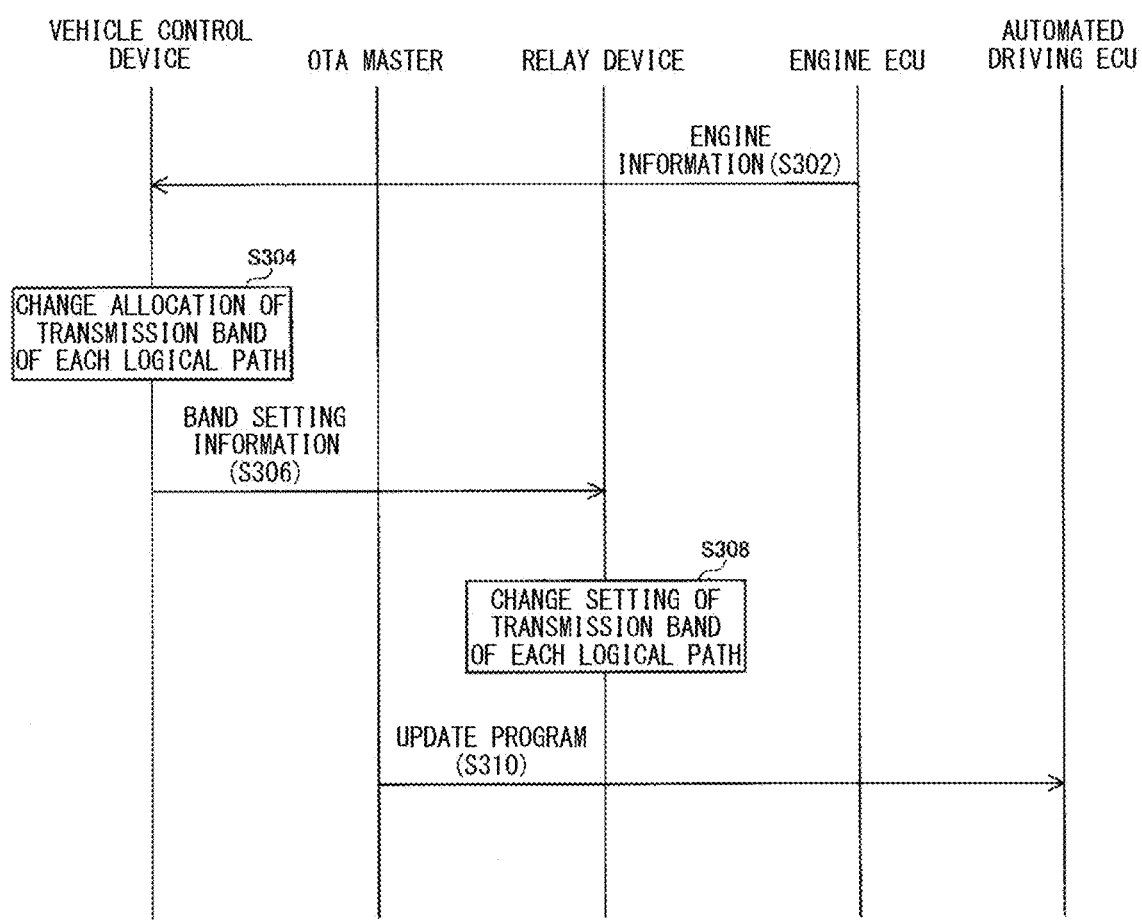
FIG. 15 shows an example of a sequence of a process of changing transmission bands of logical paths between function units in the in-vehicle system according to the embodiment of the present disclosure.

FIG. 15 shows an example of a sequence of a process of changing transmission bands of logical paths between function units in the in-vehicle system according to the embodiment of the present disclosure.

With reference to FIG. 15, first, when the engine ECU 111B has performed switching of the operation state of the engine, the engine ECU 111B transmits, to the vehicle control device 100 via the relay device 211, engine information indicating that switching of the operation state of the engine has been performed (step S302).

Next, the vehicle control device 100 changes allocation of transmission bands of a plurality of logical paths between the OTA master 111C and the automated driving ECU 111D in accordance with the state of the vehicle 1 indicated by the engine information. More specifically, the vehicle control device 100 determines an allocation content of the transmission band of each logical path between the OTA master 111C and the automated driving ECU 111D in accordance with the allocation pattern, in the pattern table PT1 in the storage unit 40, that corresponds to the operation state of the engine indicated by the engine information (step S304).

Next, upon determining the allocation content of the transmission band of each logical path between the OTA master 111C and the automated driving ECU 111D, the vehicle control device 100 transmits band setting information indicating each determined transmission band, to the relay device 211A, for example (step S306).

Upon receiving the band setting information from the vehicle control device 100, the relay device 211A changes the setting of the transmission band of each logical path between the OTA master 111C and the automated driving ECU 111D in accordance with the received band setting information (step S308).

Next, the OTA master 111C transmits an update program to the automated driving ECU 111D via the relay device 211A by using the logical paths after the setting change (step S310).

Figure 16:
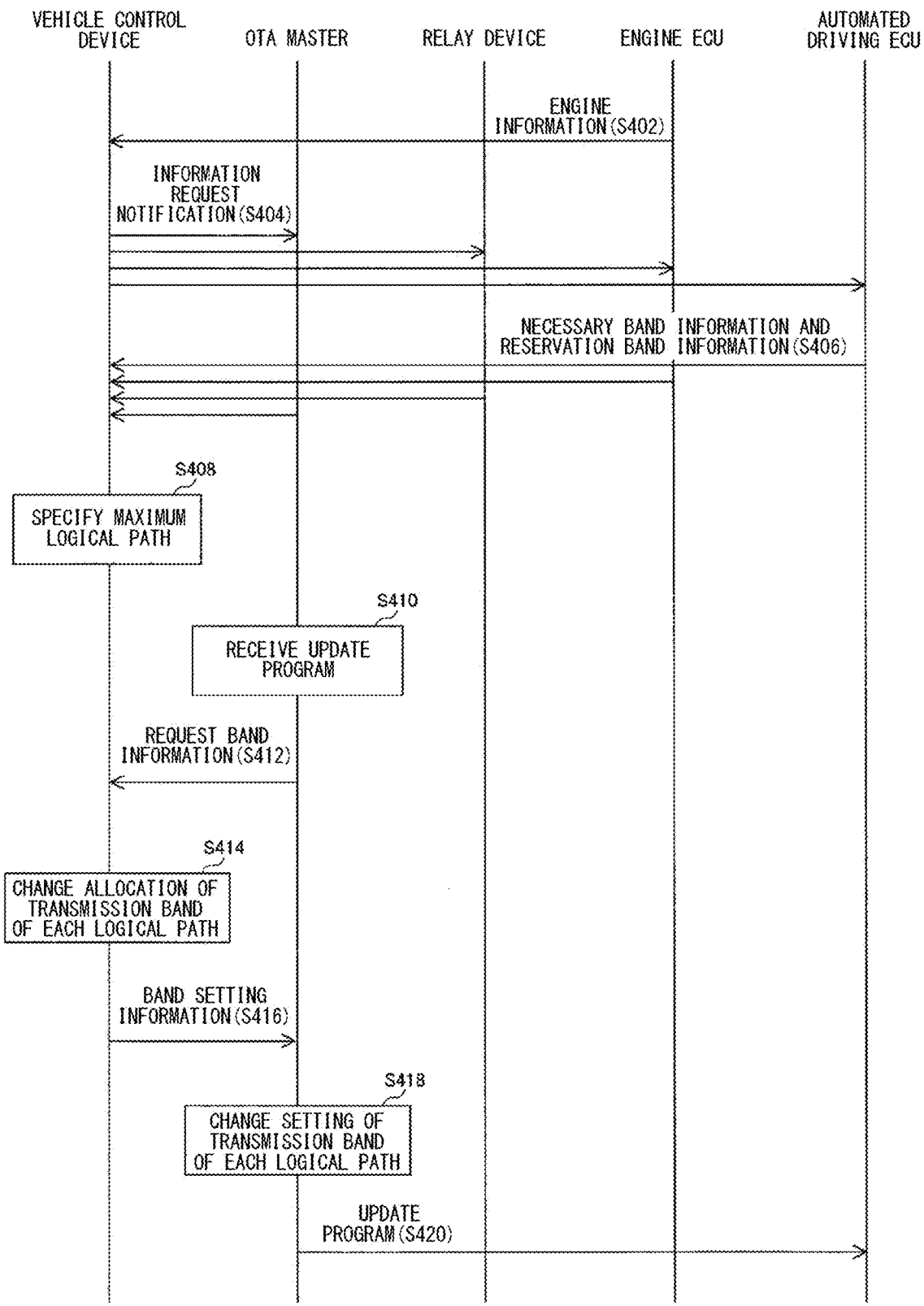
FIG. 16 shows another example of a sequence of a process of changing transmission bands of logical paths between function units in the in-vehicle system according to the embodiment of the present disclosure.

FIG. 16 shows another example of a sequence of a process of changing transmission bands of logical paths between function units in the in-vehicle system according to the embodiment of the present disclosure.

With reference to FIG. 16, first, when the engine ECU 111B has performed switching of the operation state of the engine, the engine ECU 111B transmits, to the vehicle control device 100 via the relay device 211, engine information indicating that switching of the operation state has been performed (step S402).

Next, upon receiving the engine information from the engine ECU 111B via the relay device 211, the vehicle control device 100 transmits, to each function unit in the in-vehicle network 12, information request notification indicating that necessary band information and reservation band information should be transmitted (step S404).

Next, as a response to the information request notification from the vehicle control device 100, each function unit transmits necessary band information and reservation band information to the vehicle control device 100 (step S406).

Next, on the basis of the necessary band information and the reservation band information received from each function unit, the vehicle control device 100 specifies the maximum logical path out of the logical paths (step S408).

Next, for example, the OTA master 111C receives an update program for the automated driving ECU 111D from the server 180 via the TCU 111A and the relay device 211A (step S410).

Next, the OTA master 111C transmits, to the vehicle control device 100, request band information indicating a transmission band necessary for transmission of the update program to the automated driving ECU 111D (step S412).

Next, the vehicle control device 100 compares the transmission band indicated by the request band information received from the OTA master 111C with the transmission band of the maximum logical path among the logical paths, and changes allocation of the transmission band of each logical path between the OTA master 111C and the automated driving ECU 111D in accordance with the comparison result (step S414).

Next, upon determining the allocation content of the transmission band of each logical path between the OTA master 111C and the automated driving ECU 111D, the vehicle control device 100 transmits band setting information indicating each determined transmission band, to the OTA master 111C, for example (step S416).

Upon receiving the band setting information from the vehicle control device 100, the OTA master 111C changes the setting of the transmission band of each logical path between the OTA master 111C and the automated driving ECU 111D in accordance with the received band setting information (step S418).

Next, the OTA master 111C transmits an update program to the automated driving ECU 111D via the relay device 211A by using logical paths after the setting change (step S420).

Figure 17:
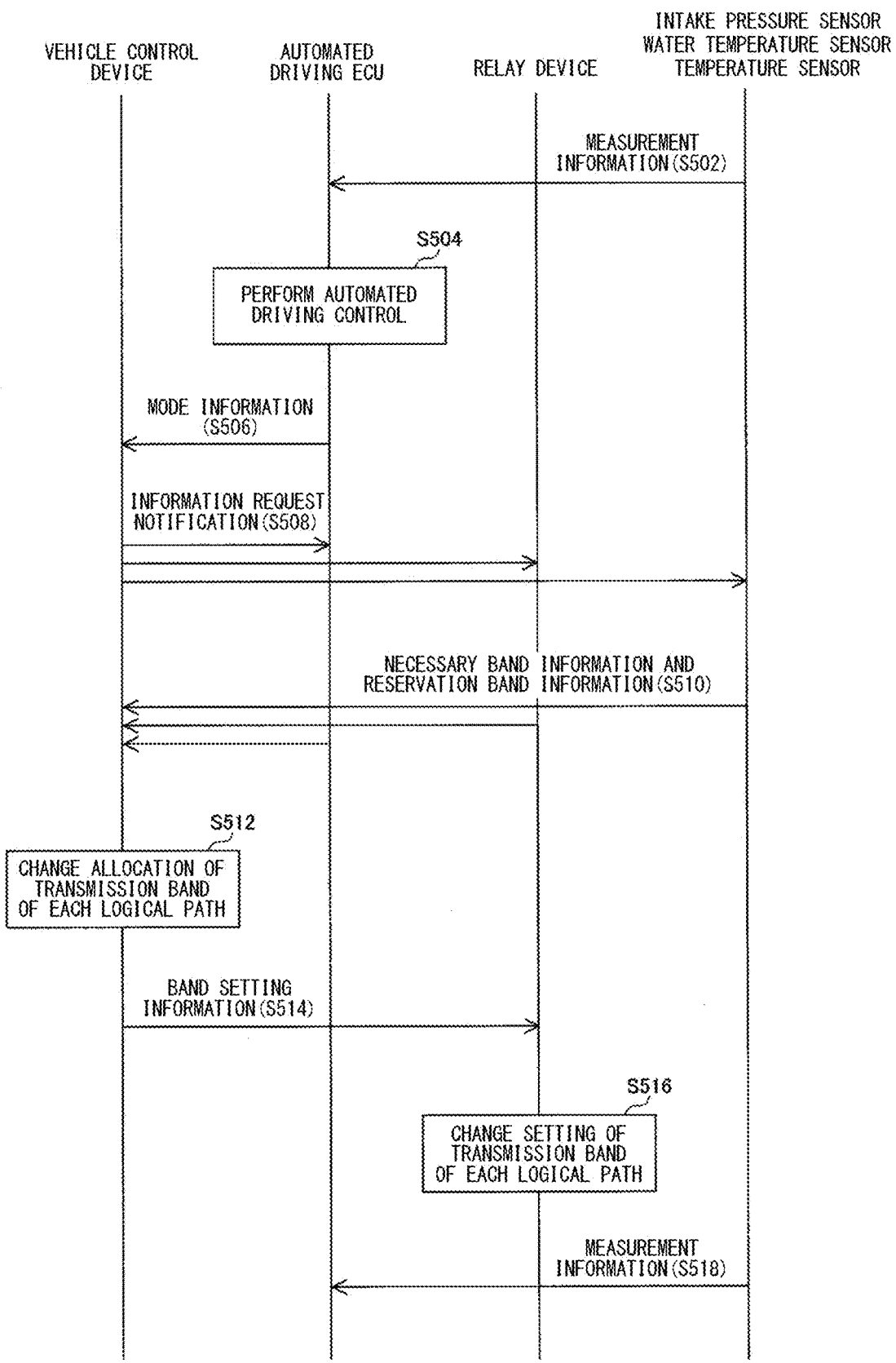
FIG. 17 shows another example of a sequence of a process of changing transmission bands of logical paths between function units in the in-vehicle system according to the embodiment of the present disclosure.

FIG. 17 shows another example of a sequence of a process of changing transmission bands of logical paths between function units in the in-vehicle system according to the embodiment of the present disclosure.

With reference to FIG. 17, first, each of the intake pressure sensor 111E, the water temperature sensor 111F, and the temperature sensor 111G transmits measurement information to the automated driving ECU 111D via the relay device 211B by using a corresponding logical path (step S502).

The automated driving ECU 111D performs detection of the traveling state of the vehicle 1 on the basis of the received measurement information from each sensor, and automated driving control based on the detection result (step S504).

Next, when the automated driving ECU 111D has performed switching from the automated driving mode to the manual driving mode in accordance with an operation by the user, for example, the automated driving ECU 111D transmits, to the vehicle control device 100 via the relay device 211, mode information indicating that switching of the driving mode has been performed (step S506).

Next, upon receiving the mode information from the automated driving ECU 111D via the relay device 211, the vehicle control device 100 transmits, to each function unit in the in-vehicle network 12, information request notification indicating that necessary band information and reservation band information should be transmitted (step S508).

Next, as a response to the information request notification from the vehicle control device 100, each function unit transmits necessary band information and reservation band information to the vehicle control device 100 (step S510).

Next, on the basis of the necessary band information and the reservation band information received from each function unit, the vehicle control device 100 changes allocation of the transmission band of each logical path between each sensor described above and the automated driving ECU 111D (step S512).

Next, upon determining the allocation content of the transmission band of each logical path between each sensor described above and the automated driving ECU 111D, the vehicle control device 100 transmits band setting information indicating each determined transmission band, to the relay device 211B, for example (step S514).

Upon receiving the band setting information from the vehicle control device 100, the relay device 211B changes the setting of the transmission band of each logical path between the relay device 211B and the automated driving ECU 111D in accordance with the received band setting information (step S516).

Next, each of the intake pressure sensor 111E, the water temperature sensor 111F, and the temperature sensor 111G transmits measurement information to the automated driving ECU 111D via the relay device 211B by using a corresponding logical path after the setting change (step S518).

In the in-vehicle system 300 according to the embodiment of the present disclosure, the vehicle control device 100 is one of devices that form the in-vehicle network 12. However, the present disclosure is not limited thereto. The vehicle control device 100 may be included in a relay device 211 or an in-vehicle ECU 111. That is, the vehicle control device 100 may be integrated in a relay device 211 or an in-vehicle ECU 111. The vehicle control device 100 may be provided outside the in-vehicle network 12.

The vehicle control device 100 may be realized by a device outside the vehicle 1, such as the server 180. In this case, a part or all of functions of the vehicle control device 100 according to the embodiment of the present disclosure may be provided through cloud computing. That is, the vehicle control device 100 according to the embodiment of the present disclosure may be implemented by a plurality of cloud servers and the like.

In the in-vehicle system 300 according to the embodiment of the present disclosure, each logical path is realized by a plurality of physical transmission paths which are in the form of branches extending from a function unit to another function unit. However, the present disclosure is not limited thereto. Each logical path may be realized by one physical transmission path extending from a function unit to another function unit.

In the in-vehicle system 300 according to the embodiment of the present disclosure, the first logical path is realized by a plurality of transmission paths including the first transmission path and the second transmission path each being a physical transmission path, and the second logical path is realized by a plurality of transmission paths including the first transmission path and the third transmission path each being a physical transmission path. However the present disclosure is not limited thereto. Each logical path may be realized by a common one or plurality of transmission paths.

In the vehicle control device 100 according to the embodiment of the present disclosure, the allocation unit 30 determines an allocation content of the transmission band of each logical path between function units on the basis of necessary band information acquired by the configuration information acquisition unit 20 and the state of the vehicle 1 indicated by state information acquired by the state information acquisition unit 10. However, the present disclosure is not limited thereto. The allocation unit 30 may determine an allocation content of the transmission band of each logical path between function units on the basis of function unit information as an example of configuration information acquired by the configuration information acquisition unit 20 and the state of the vehicle 1 indicated by state information acquired by the state information acquisition unit 10.

In the vehicle control device 100 according to the embodiment of the present disclosure, the allocation unit 30 allocates a transmission band that is greater than zero, to all of the logical paths. However, the present disclosure is not limited thereto. The allocation unit 30 may be configured not to allocate any transmission band to some logical paths in a certain state of the vehicle 1.

Meanwhile, there is a desire for a technology that can more appropriately change network settings in an in-vehicle network in accordance with the communication state in the in-vehicle network.

For example, in recent years, as a result of prevalence of high-end CPUs, GPUs, etc., functions of a plurality of ECUs have been integrated, whereby ECUs having various functions have been developed. In such a multifunctional ECU, requirements, e.g., transmission bands, for communication with another ECU are more likely to vary in accordance with the state of the vehicle.

In addition, with respect to a vehicle, such as an electric vehicle, in which current consumption directly influences the cruising distance of the vehicle, there is a desire for a technology in which current consumption in an in-vehicle network is suppressed by more appropriately setting the in-vehicle network such that excessive loading of network resources is avoided.

In this regard, in the vehicle control device 100 according to the embodiment of the present disclosure, the state information acquisition unit 10 acquires state information indicating the state of the vehicle 1. The allocation unit 30 changes allocation of transmission bands of a plurality of logical paths between function units in accordance with the state of the vehicle 1 indicated by the state information acquired by the state information acquisition unit 10.

In the in-vehicle system 300 according to the embodiment of the present disclosure, the vehicle control device 100 changes allocation of transmission bands of a plurality of logical paths between function units in accordance with the state of the vehicle 1, and transmits band setting information indicating the transmission band after having been changed of each logical path, to one or a plurality of function units. Each function unit changes the transmission band of each logical path in accordance with the band setting information received from the vehicle control device 100.

In a communication management method according to the embodiment of the present disclosure, first, the vehicle control device 100 acquires state information indicating the state of the vehicle 1. Next, in accordance with the state of the vehicle 1 indicated by the acquired state information, the vehicle control device 100 changes allocation of transmission bands of a plurality of logical paths between function units.

Due to the configuration or method in which allocation of transmission bands of a plurality of logical paths between function units is changed in accordance with the state of the vehicle 1, transmission bands can be more appropriately allocated, in the in-vehicle network 12, to logical paths between function units in accordance with the content of communication performed for each state of the vehicle 1, for example. Accordingly, for example, if the transmission band of a logical path having a small amount of data to be transmitted is set to be small while the transmission band of a logical path having a large amount of data to be transmitted is set to be large, data of a large volume can be more efficiently transmitted, for example.

Therefore, in the vehicle control device, the in-vehicle system, and the communication management method according to the embodiment of the present disclosure, data transmission in the in-vehicle network can be more efficiently performed.

The above embodiment is merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional notes below.

[Additional Note 1]

A management device to be used in an in-vehicle network including a plurality of function units installed in a vehicle, the management device comprising:
 a state information acquisition unit configured to acquire state information indicating a state of the vehicle;
 an allocation unit configured to change allocation of transmission bands of a plurality of logical paths between the function units in accordance with the state of the vehicle indicated by the state information acquired by the state information acquisition unit; and
 a configuration information acquisition unit configured to acquire configuration information regarding a configuration of the in-vehicle network, wherein
 when, on the basis of the state information acquired by the state information acquisition unit, the configuration information acquisition unit has recognized that the state of the vehicle has been transitioned, the configuration information acquisition unit acquires, as the configuration information, necessary band information indicating a band necessary for communication between the function units, for each state of the vehicle, and
 on the basis of the necessary band information acquired by the configuration information acquisition unit and the state of the vehicle indicated by the state information acquired by the state information acquisition unit, the allocation unit determines an allocation content of the transmission band of each logical path between the function units.

[Additional Note 2]

An in-vehicle system comprising:
 a plurality of function units installed in a vehicle; and
 a management device to be used in an in-vehicle network including the plurality of function units, wherein
 each function unit transmits state information indicating a state of the vehicle, to the management device, when, on the basis of the state information received from the function unit, the management device has recognized that the state of the vehicle has been transitioned, the management device acquires necessary band information indicating a band necessary for communication between the function units, for each state of the vehicle, the management device changes allocation of transmission bands of a plurality of logical paths between the function units in accordance with the state of the vehicle and the acquired necessary band information, and transmits band setting information indicating a transmission band after having been changed of each logical path, to one or a plurality of the function units, and each function unit changes the transmission band of each logical path in accordance with the band setting information received from the management device.

[Additional Note 3]

A management device comprising a processor,
the processor realizing:
a state information acquisition unit configured to acquire state information indicating a state of a vehicle; and
an allocation unit configured to change allocation of transmission bands of a plurality of logical paths between function units in accordance with the state of the vehicle indicated by the state information acquired by the state information acquisition unit.

[Additional Note 4]

An in-vehicle system comprising:
a plurality of in-vehicle devices installed in a vehicle; and
a management device to be used in an in-vehicle network including the plurality of in-vehicle devices, wherein
the management device changes allocation of transmission bands of a plurality of logical paths between the in-vehicle devices in accordance with the state of the vehicle, and transmits band setting information indicating a transmission band after having been changed of each logical path, to one or a plurality of the in-vehicle devices, and
each in-vehicle device changes the transmission band of each logical path in accordance with the band setting information received from the management device.

REFERENCE SIGNS LIST 1 vehicle
10 state information acquisition unit
11A, 11B, 11C, 11D, 11E, 11F, 11G, 11H, 11J, 11K, 11L Ethernet cable
12 in-vehicle network
20 configuration information acquisition unit
30 allocation unit
40 storage unit
100 vehicle control device
111 in-vehicle ECU
111A TCU (in-vehicle ECU)
111B engine ECU (in-vehicle ECU)
111C OTA master (in-vehicle ECU)
111D automated driving ECU (in-vehicle ECU)
111E intake pressure sensor (in-vehicle ECU)
111F water temperature sensor (in-vehicle ECU)
111G temperature sensor (in-vehicle ECU)
111H image sensor (in-vehicle ECU)
112A, 112B, 112C, 112D, 112E, 112F, 112G application
161 wireless base station device
170 external network
180 server
211A, 211B relay device
212A, 212B application
300 in-vehicle system
400 communication system

The invention claimed is:

1. A management device to be used in an in-vehicle network including a plurality of function units that are installed in a vehicle and that are connected to each other via a relay device, the management device comprising:
processing circuitry configured to:
acquire state information indicating a state of the vehicle; and
change allocation of transmission bands of a plurality of logical paths in a set of the function units in accordance with the state of the vehicle indicated by the state information, wherein
a first logical path among the plurality of logical paths is realized by a plurality of transmission paths including a first transmission path and a second transmission path each being a physical transmission path, and
a second logical path among the plurality of logical paths is realized by a plurality of transmission paths including the first transmission path and a third transmission path each being a physical transmission path, the third transmission path being different from each of the first transmission path and the second transmission path.

2. The management device according to claim 1, wherein the processing circuitry is configured to:
store an allocation pattern of the transmission band of each logical path for each state of the vehicle, and
determine an allocation content of the transmission band of each logical path between the function units in accordance with the allocation pattern corresponding to the state of the vehicle.

3. The management device according to claim 1, wherein the processing circuitry is configured to:
acquire configuration information regarding a configuration of the in-vehicle network, and
determine an allocation content of the transmission band of each logical path between the function units on the basis of the configuration information and the state of the vehicle indicated by the state information.

4. The management device according to claim 3, wherein the processing circuitry is configured to:
in accordance with transition of the state of the vehicle, acquire, as the configuration information, necessary band information indicating a band necessary for communication between the function units, for each state of the vehicle, and
determine an allocation content of the transmission band of each logical path between the function units on the basis of the necessary band information and the state of the vehicle indicated by the state information.

5. The management device according to claim 1, wherein the processing circuitry is configured to allocate a transmission band that is greater than zero to all of the logical paths.

6. An in-vehicle system comprising:
a plurality of function units installed in a vehicle and connected to each other via a relay device; and
a management device to be used in an in-vehicle network including the plurality of function units, wherein
the management device is configured to change allocation of transmission bands of a plurality of logical paths in a set of the function units in accordance with a state of the vehicle and transmit band setting information indicating a transmission band of each of the logical paths after having been changed to one or a plurality of the set of the function units, each of the function units in the set is configured to change the transmission band of each of the logical paths in accordance with the band setting information received from the management device, a first logical path among the plurality of logical paths is realized by a plurality of transmission paths including a first transmission path and a second transmission path each being a physical transmission path, and a second logical path among the plurality of logical paths is realized by a plurality of transmission paths including the first transmission path and a third transmission path each being a physical transmission path, the third transmission path being different from each of the first transmission path and the second transmission path.

7. A communication management method to be performed in a management device to be used in an in-vehicle network including a plurality of function units that are installed in a vehicle and that are connected to each other via a relay device, the communication management method comprising the steps of:

acquiring state information indicating a state of the vehicle; and changing allocation of transmission bands of a plurality of logical paths in a set of the function units in accordance with the state of the vehicle indicated by the acquired state information, wherein a first logical path among the plurality of logical paths is realized by a plurality of transmission paths including a first transmission path and a second transmission path each being a physical transmission path, and a second logical path among the plurality of logical paths is realized by a plurality of transmission paths including the first transmission path and a third transmission path each being a physical transmission path, the third transmission path being different from each of the first transmission path and the second transmission path.

8. A non-transitory computer-readable storage medium having, stored therein, a communication management program to be used in a management device to be used in an in-vehicle network including a plurality of function units that are installed in a vehicle and that are connected to each other via a relay device, the communication management program being for causing a computer to function as:

a state information acquisition unit configured to acquire state information indicating a state of the vehicle; and an allocation unit configured to change allocation of transmission bands of a plurality of logical paths in a set of the function units in accordance with the state of the vehicle indicated by the state information acquired by the state information acquisition unit, wherein a first logical path among the plurality of logical paths is realized by a plurality of transmission paths including a first transmission path and a second transmission path each being a physical transmission path, and a second logical path among the plurality of logical paths is realized by a plurality of transmission paths including the first transmission path and a third transmission path each being a physical transmission path, the third transmission path being different from each of the first transmission path and the second transmission path.

* * * * *